(12) United States Patent
Kobashi et al.

(10) Patent No.: US 11,346,293 B2
(45) Date of Patent: May 31, 2022

(54) CONTROL DEVICE FOR INTERNAL COMBUSTION ENGINE

(71) Applicant: TOYOTA JIDOSHA KABUSHIKI KAISHA, Toyota (JP)

(72) Inventors: Noriyasu Kobashi, Hachioji (JP);
Noriyasu Adachi, Numazu (JP);
Yusuke Saito, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/151,875

(22) Filed: Jan. 19, 2021

(65) Prior Publication Data

US 2021/0231063 A1 Jul. 29, 2021

(30) Foreign Application Priority Data

Jan. 24, 2020 (JP) .............................. JP2020-009897

(51) Int. Cl.
*F02D 35/00* (2006.01)
*F01N 3/021* (2006.01)
*F02D 41/02* (2006.01)

(52) U.S. Cl.
CPC ......... *F02D 35/0092* (2013.01); *F01N 3/021* (2013.01); *F01N 2430/02* (2013.01); *F02D 41/029* (2013.01); *F02D 2200/0802* (2013.01)

(58) Field of Classification Search
CPC ...... F01N 3/035; F01N 3/021; F01N 2430/02; F01N 2560/06; F01N 2900/0422; F01N 2900/08; F01N 2900/1404; F01N 3/101; F01N 9/002; F02D 2200/0802; F02D 35/0092; F02D 2041/0265; F02D 2200/0812; F02D 41/029; F02D 41/123; F02D 41/1446; Y02T 10/12; Y02T 10/40
See application file for complete search history.

(56) References Cited

U.S. PATENT DOCUMENTS

| | | | | |
|---|---|---|---|---|
| 2015/0369153 | A1* | 12/2015 | Tsunooka | F02D 41/123 60/285 |
| 2017/0204761 | A1* | 7/2017 | Ulrey | F02D 41/0005 |
| 2017/0284268 | A1* | 10/2017 | Nakagawa | F01N 3/021 |
| 2018/0216552 | A1* | 8/2018 | Yokoi | B60W 20/16 |

FOREIGN PATENT DOCUMENTS

| | | |
|---|---|---|
| JP | 2006-242086 A | 9/2006 |
| JP | 2011-099451 A | 5/2011 |

* cited by examiner

*Primary Examiner* — Phutthiwat Wongwian
*Assistant Examiner* — Diem T Tran
(74) *Attorney, Agent, or Firm* — Finnegan, Henderson, Farabow, Garrett & Dunner, LLP

(57) ABSTRACT

An internal combustion engine comprises an engine body, a filter provided in an exhaust passage of the engine body and trapping particulate matter in the exhaust, and a temperature sensor detecting a temperature of gas flowing cut from the filter. A control device controlling this internal combustion engine comprises a fuel cut control pan configured to perform fuel cut control stopping a supply of fuel to a combustion chamber of the engine body and a forced ending part configured to forcibly make the fuel cut control end even if a condition for performance of fuel cut control had stood based on a trend in change of temperature of the gas temperature detected by the temperature sensor.

8 Claims, 15 Drawing Sheets

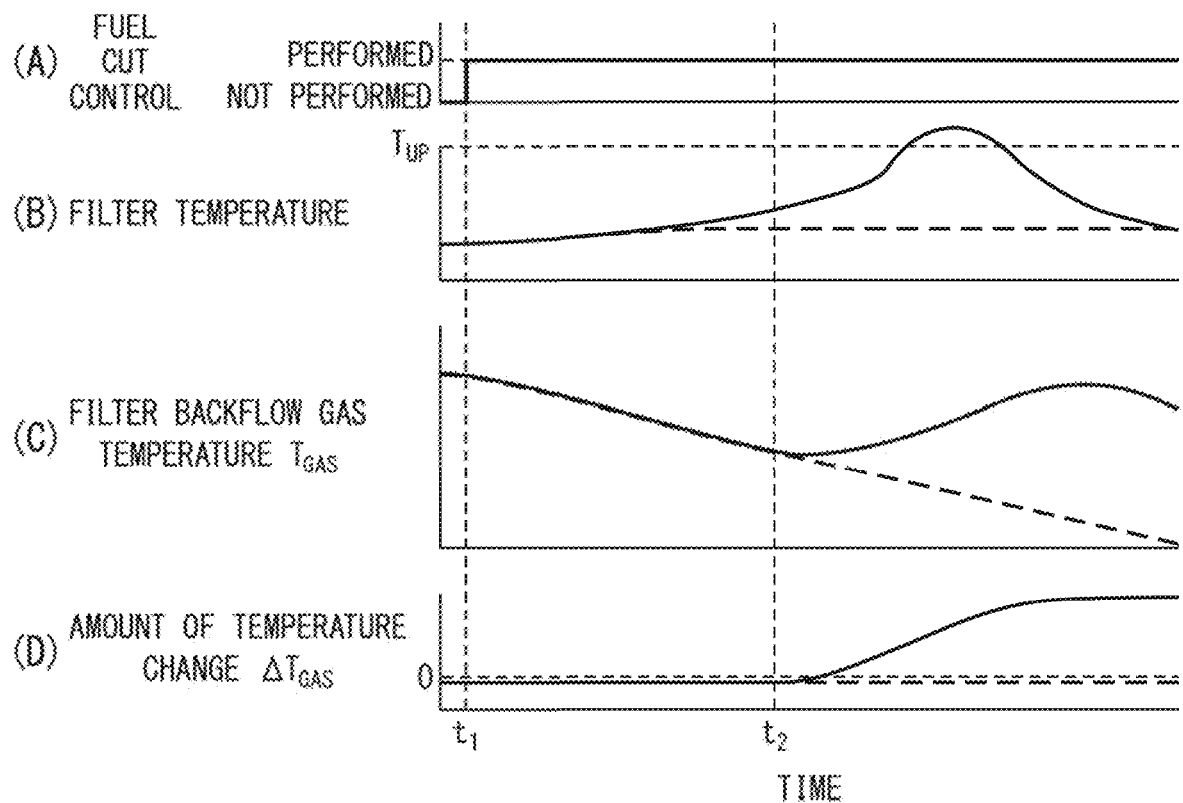
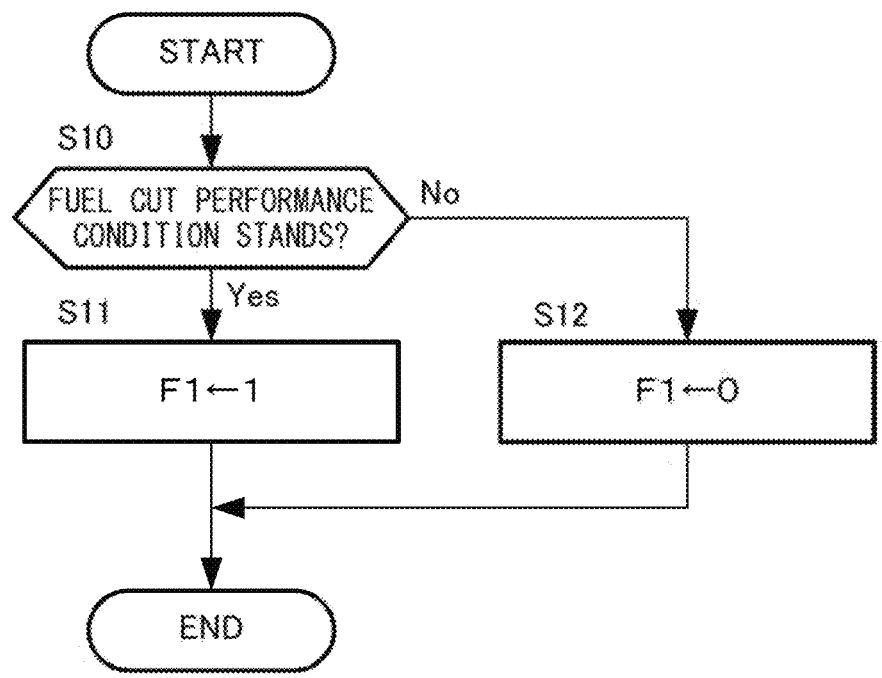

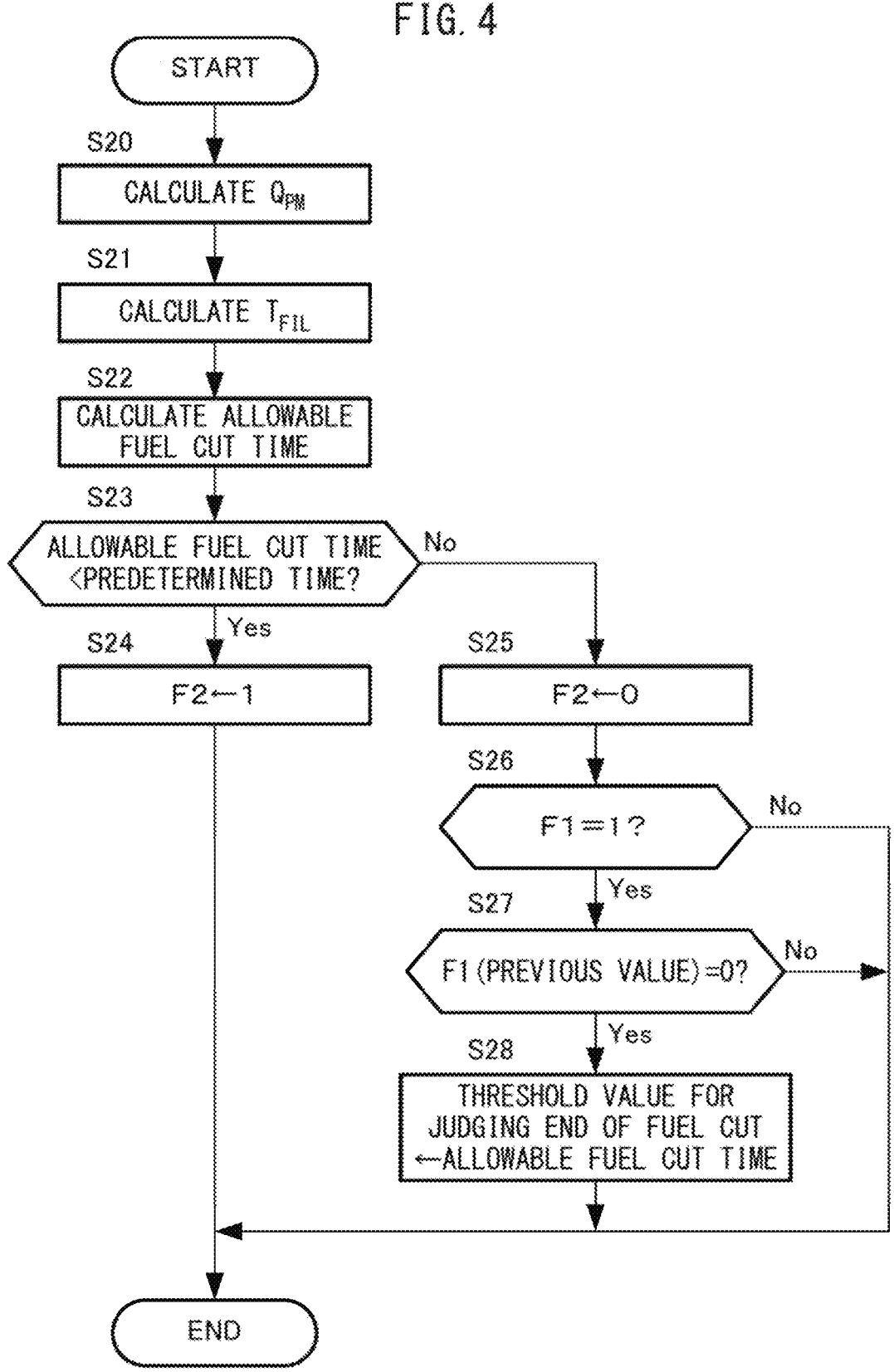

CONTROL DEVICE FOR INTERNAL COMBUSTION ENGINE

FIELD

The present disclosure relates to a control device for an internal combustion engine.

BACKGROUND

Japanese Unexamined Patent Publication No 2011-99451 discloses a conventional internal combustion engine provided with a filter for trapping particulate matter in the exhaust (below, referred to as "PM") in an exhaust passage. Further, it discloses a control device for controlling this internal combustion engine which judges if a filter temperature is liable to exceed a predetermined upper limit temperature when performing fuel cut control and is configured to prohibit fuel cut control when there is that liability.

SUMMARY

However, the above-mentioned conventional control device of an internal combustion engine judges whether the filter temperature w as liable to exceed the predetermined upper limit temperature when performing fuel cut control based on the filter temperature and amount of PM deposition estimated during engine operation. For this reason, the error in estimation has to be considered. Even if actually performing fuel cut control and the filter temperature does not exceed the upper limit temperature, fuel cut control was liable to be unnecessarily prohibited. As a result, the opportunities for burning off the PM trapped at the filler were liable to end up being reduced.

The present disclosure was made focusing on such a problem and has as its object to keep the opportunities for burning off the PM trapped at the filter from ending up being reduced.

To solve the above problem, the internal combustion engine according to one aspect of the present disclosure is provided with an engine body, a filter provided in an exhaust passage of the engine body and trapping particulate matter in exhaust, and a temperature sensor provided at the exhaust passage at the downstream side from the filter in a direction of flow of exhaust and detecting a temperature of gas flowing out from the filter. Further, the control device for the internal combustion engine comprises a fuel cut control part configured to perform fuel cut control stopping a supply of fuel to a combustion chamber of the engine body and a forced ending part configured to forcibly make the fuel cut control end even if a condition for performance of fuel cut control had stood based on a trend in the change of temperature of the gas temperature detected by the temperature sensor.

According to this aspect of the present disclosure, it is possible to directly detect whether the filter temperature is liable to excessively rise based on a change of temperature of the gas temperature detected by the temperature sensor. For this reason, since it is possible to keep the fuel cut control from being unnecessarily prohibited, it is possible to keep the opportunities for burning off PM trapped at the filter from ending up being reduced.

BRIEF DESCRIPTION OF DRAWINGS

FIG. 2 is a view showing changes in temperature etc. of a filler backflow gas temperature in a case where an amount of heat of combustion of PM during fuel cut control became excessive (solid line) and a case where that did not (broken line).

FIG. 3 is a flow chart explaining control for setting a fuel cut condition standing flag F1.

FIG. 4 is a flow chart explaining control for setting a fuel cut prohibit flag F2.

DESCRIPTION OF EMBODIMENTS

Figure 1:
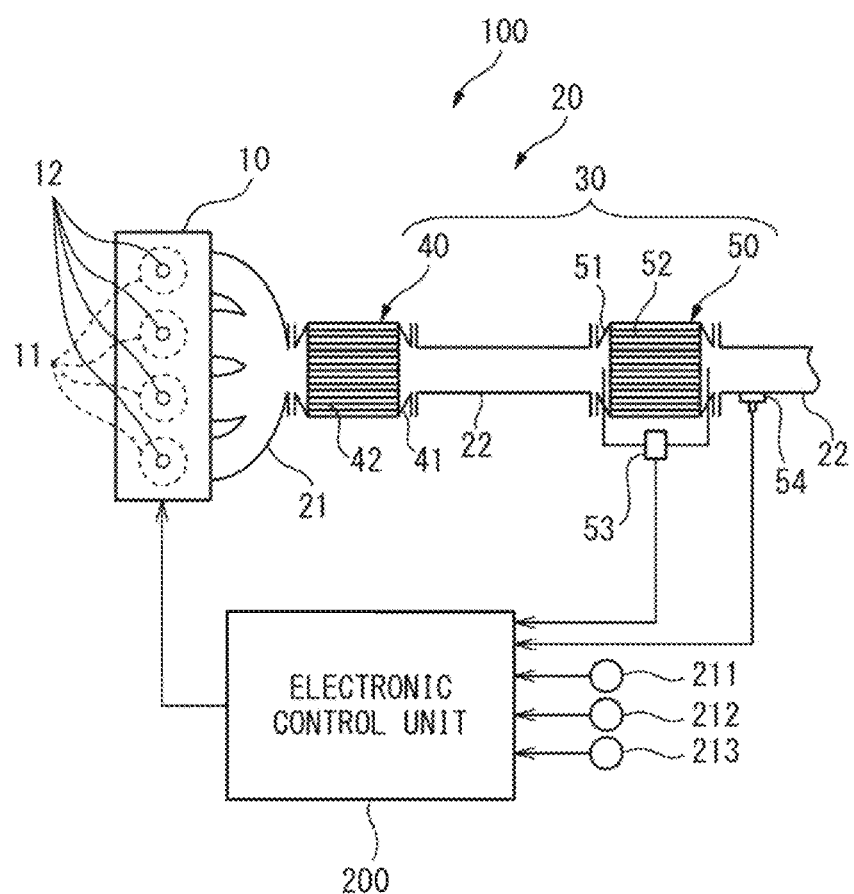
FIG. 1 is a schematic view of the configuration of an internal combustion engine according to a first embodiment of the present disclosure and an electronic control unit controlling the internal combustion engine.

Below, referring to the drawings, embodiments of the present disclosure will be explained in detail. Note that, in the following explanation, similar components are assigned the same reference signs.

First Embodiment

FIG. 1 is a schematic view of the configuration of an internal combustion engine 100 according to a first embodiment of the present disclosure and an electronic control unit 200 controlling the internal combustion engine 100.

The internal combustion engine 100 according to the present embodiment is a spark ignition type of gasoline engine which is provided with an engine body 10 provided with a plurality of cylinders 11 and an exhaust system 20. Note that, the type of the internal combustion engine 100 is not particularly limited. It may be a premix compression ignition type of gasoline engine or may be a diesel engine.

The engine body 10 makes fuel injected from fuel injectors 12 burn inside the cylinders 11 to, for example, generate power for driving a vehicle etc. Note that, in FIG. 1, to present complication of the drawings, the intake system, spark plugs, etc. are omitted from illustration. Further, the type of injection of fuel is not limned to direct cylinder injection and may also be port injection.

The exhaust system 20 is a system for purifying the exhaust generated inside of the cylinders 11 (combustion gas) and discharging it to the outside air and is provided with an exhaust manifold 21, exhaust pipe 22, and exhaust after-treatment system 30.

The exhaust produced in the cylinders 11 of the engine body 10 is collected by the exhaust manifold 21 and discharged to the exhaust pipe 22. The exhaust contains unburned gases (carbon monoxide (CO) and hydrocarbons (HC)) and nitrogen oxides (NOx), particulate matter (PM), and other harmful substances. For this reason, in the present embodiment, the exhaust pipe 22 is provided with the exhaust after-treatment system 30 for removing these harmful substances in the exhaust comprised of a catalyst device 40 and a PM trapping device 50. Further, in the present embodiment, an exhaust temperature sensor 54 is provided in the exhaust pipe 22 at the downstream side from the PM trapping device 50 in the direction of flow of exhaust.

The catalyst device 40 is provided with a casing 41 and an exhaust purification catalyst 42 earned on a honeycomb type of support made of cordierite (ceramic) held inside the casing 41. The exhaust purification catalyst 42 is, for example, an oxidation catalyst (two-way catalyst) or three-way catalyst. It is not limited to these. A suitable catalyst can be used in accordance with the type or application of the internal combustion engine 100. In the present embodiment, as the exhaust purification catalyst 42, a three-way catalyst is used. If using a three-way catalyst as the exhaust purification catalyst 42, the unburned gases (CO and HC) and NOx in the exhaust flowing into the catalyst device 40 are removed by the exhaust purification catalyst 42.

The PM trapping device 50 is provided in the exhaust pipe 22 at the downstream side from the catalyst device 40 in the direction of How of exhaust. The PM trapping device 50 is provided with a casing 51 and a wall flow type of filter 52 held inside the casing 51. The filter 52 traps the PM in the exhaust flowing into the PM trapping device 50.

If the internal combustion engine 100 is a gasoline engine, the PM trapping device 50 is sometimes called a "GPF" (gasoline particulate filter), while if the internal combustion engine 100 is a diesel engine, it is sometimes called a "DPF" (diesel particulate filter).

A differential pressure sensor 53 is a sensor for detecting a pressure difference before and after the filter 52 (below, referred to as a "filter differential pressure") and is attached to the casing 51. The present embodiment calculates an estimated value of the amount of PM deposited on the filter 52 (below, referred to as the "amount of PM deposition") (below, referred to as the "estimated amount of PM deposition") $Q_{PM}$ based on the filter differential pressure detected by this differential pressure sensor 53. However, the amount of PM deposition is not limited to estimation by such a method. For example, it may be estimated according to the engine operating state or may be estimated by another method suitably selected from among various known methods.

The exhaust temperature sensor 54 is a sensor for detecting the temperature of the gas flowing out from the PM trapping device 50 (below, referred to as the "filter backflow gas temperature") $T_{GAS}$ and is attached to the exhaust pipe 22 near the outlet side of the PM trapping device 50.

The electronic control unit 200 is a microcomputer provided with components connected to each other by a bidirectional bus such as a central processing unit (CPU), read only memory (ROM) or random access memory (RAM) or other various memories, an input port, and an output port.

The electronic control unit 200 receives as input the output signals from not only the above-mentioned differential pressure sensor 53 and exhaust temperature sensor 54, but also a load sensor 211 generating an output voltage proportional to an amount of depression of an accelerator pedal (not shown) corresponding to a load of the engine body 10 (engine load), a crank angle sensor 212 generating an output pulse as a signal for calculation of the engine speed etc. every lime a crankshaft of the engine body 10 (not shown) rotates by for example, 15°, an air-fuel ratio sensor 213 for example provided at a header part of the exhaust manifold 21 and detecting an air-fuel ratio of exhaust flowing into the catalyst device 40 (below, referred to as the "exhaust air-fuel ratio"), and various other types of sensors.

The electronic control unit 200 controls the fuel injectors 12 etc. to control the internal combustion engine 100 based on the input output signals of various sensors etc.

In the present embodiment, the electronic control unit 200 controls by feedback the amounts of injection of the fuel injectors 12 so Lite exhaust air-fuel ratio becomes a target air-fuel ratio (in the present embodiment, the stoichiometric air-fuel ratio) while controlling the amounts of injection of the fuel injectors 12 so the engine output torque becomes a target torque corresponding to the engine load. That is, the electronic control unit 200 makes an air-fuel mixture burn in the cylinders 11 by an air excess rate λ of 1 to make the internal combustion engine 100 operate so that the engine output torque becomes a target torque corresponding to the engine load.

Further, the electronic control unit 200 performs fuel cut control slopping injection of fuel from tire fuel injectors 12 when the vehicle in which the internal combustion engine 100 is mounted is decelerating and otherwise when a predetermined condition for performance of fuel cut stands during operation of the internal combustion engine 100.

When making an air-fuel mixture burn in the cylinders 11 by an air excess rate λ of less than 1, exhaust not containing oxygen discharged from the cylinders 11 flows into the PM trapping device 50. When in this way exhaust not containing oxygen discharged from the cylinders 11 flows into the PM trapping device 50 (below, referred to as "when the inside of the PM trapping device 50 becomes an exhaust atmosphere"), since the PM trapping device 50 has no oxygen present in it, the PM will not react with oxygen and burn inside the PM trapping device 50 and the PM in the exhaust flowing into the PM trapping device 50 will continue to be trapped at the filler 52.

On the other hand, if fuel cut control is performed, the supply of fuel to the cylinders 11 of the engine body 10 is stopped, air flows into the PM trapping device 50, and the inside of the PM trapping device 50 becomes an air atmosphere. When fuel cut control is perforated and the inside of the PM trapping device 50 becomes an air atmosphere, if the filter temperature becomes equal to or greater than a predetermined PM combustion temperature (for example, 500 to 600° C.), the PM deposited on the filter 52 burns by reaction with the oxygen inside the PM trapping device 50 and is removed from the filler 52.

Here, when the filter temperature is high, the oxidation reaction speed (combustion speed) of the PM inside the PM trapping device 50 tends to become higher compared to when it is low. Further, when the amount of PM deposition is large, the amount of PM burned per unit time tends to become greater compared to when it is small. For this reason, the higher the filter temperature or the greater the amount of PM deposition, the greater the amount of Pm that is burned all at once and the greater the amount of heat generated per unit time (below, referred to as the "amount of heat of combustion of PM") tends to become. For this reason, if ending up continuing fuel cut control at such a time, the filter temperature excessively rises and ends up becoming higher than even the guaranteed durability temperature $T_{UP}$ of the filter 52, so the filter 52 and in turn the PM trapping device 50 are liable to end up being degraded.

As a method for keeping the filter 52 from excessively rising in temperature due to such heat of combustion of the PM, the method of limiting the time of performance of fuel cut control (below, referred to as the "fuel cut time") in accordance with the filter temperature and amount of PM deposition to forcibly end the fuel cut control before the filter temperature excessively rises may be mentioned. That is, the method of calculating the allowable fuel cut time in accordance with the filter temperature and amount of PM deposition during engine operation and forcibly ending the fuel cut control if the fuel cut time becomes equal to or greater than the allowable fuel cut time may be mentioned.

Here, the allowable fuel cut time has to be made shorter than the time by which the filter temperature becomes equal to or greater than the guaranteed durability temperature $T_{UP}$ when performing fuel cut control. This time can, for example, be found in accordance with the filter temperature and amount of PM deposition in advance by experiments etc.

At this time, the filter temperature and amount of PM deposition used for calculation of the allowable fuel cut lime respectively become estimated values estimated by the electronic control unit 200 during engine operation. Therefore, if setting the allow able fuel cut time based on the estimated values, it is necessary to consider the estimation errors of the estimated values and make the allowable fuel cut lime sufficiently shorter than the lime by which the filter temperature actually becomes equal to or greater than the guaranteed durability temperature $T_{UP}$ found by experiments etc.

For this reason, if using this method to try to keep the filter 52 from excessively rising in temperature due to the heat of combustion of PM, the total time of performance of fuel cut control during one trip (time period from when internal combustion engine 100 is started to when it is stopped) becomes shorter and the amount of PM removed from the filter 52 also is reduced. As a result, the pressure loss of the exhaust system (exhaust resistance) is liable to increase and invite a drop in the engine output or deterioration of the fuel efficiency.

Therefore, the inventors engaged in intensive research to keep the filter 52 from excessively rising in temperature due to the heat of combustion of the PM while keeping the total time of performance of fuel cut control in one trip from becoming shorter. As a result, it was learned that the trends in change of temperature of the filler backflow gas temperature $T_{GAS}$ differ between the case where during fuel cut control a large amount of PM burns ail at once and the amount of heat of combustion of PM becomes excessive, that is, the case where if ending up continuing fuel cut control as is, the filter temperature will excessively rise and will end up becoming higher than the guaranteed durability temperature $T_{UP}$, and the case where the amount of heat of combustion of PM during fuel cut control falls within an allow able range, that is, the case where even if continuing fuel cut control as is, the filter temperature will not excessively rise.

FIG. 2 is a view showing the changes in temperature of the filter backflow gas temperature $T_{GAS}$ etc. in a case where an amount of heat of combustion of PM during fuel cut control became excessive (solid line) and a case where it did not (broken line).

As shown in FIG. 2, if fuel cut control is started at the time t1 and the inside of the PM trapping device 50 becomes an air atmosphere, the PM deposited on the filter 52 starts to react with the oxygen and burn inside the PM trapping dev ice 50. If fuel cut control is started, the filler 52 is cooled by the air flowing into the PM trapping device 50 while is heated by the heat of combustion of the PM. Therefore, as shown in FIG. 2(B), the filter temperature at the time t1 on changes in accordance with the balance of the cooling by the air and the heating by the heat of combustion of the PM.

Further, the air flowing into the PM trapping device 50 is heated inside the PM trapping device 50 by heat exchange with the filter 52 or the heat of combustion of the PM while flowing out from the PM trapping device 50.

At this time, as shown in FIG. 2(C) after fuel cut control is started and while the amount of heal of combustion of PM falls within the allowable range, the trend in change of temperature of the filler backflow gas temperature $T_{GAS}$ becomes a decreasing trend. However, as shown in FIG. 2(C) by the solid line, if, at the time t2, a large amount of PM starts to burn all at once and the amount of heat of combustion of PM becomes excessive, inside the PM trapping device 50, the effect of the heat of combustion of the PM on the air becomes greater and as a result the trend in change of temperature of the filter backflow gas temperature $T_{GAS}$ switches from a decreasing trend to an increasing trend.

Therefore, for example, as shown in FIG. 2(D), if detecting the amount of change of temperature per unit time $\Delta T_{GAS}(=T_{GAS}(\text{current value})-T_{GAS}(\text{previous value}))$ of the filter backflow gas temperature $T_{GAS}$ as a parameter showing the change of temperature of the filter backflow gas temperature $T_{GAS}$, it is possible to judge that the amount of heat of combustion of PM is becoming excessive when the amount of change of temperature $\Delta T_{GAS}$ has become equal to or greater than a predetermined threshold value for judgment of excessive rise of temperature (for example, 0° C., 10° C., etc.) (that is, when the amount of temperature rise per unit time of the Alter backflow gas temperature $T_{GAS}$ has become equal to or greater than the threshold value for judgment of excessive rise of temperature). For this reason, if forcibly ending the fuel cut control at this point of time, it is possible to keep the situation of the filter temperature excessively rising and ending up becoming higher than even the guaranteed durability temperature $T_{UP}$ from occurring.

According to this method, it is possible to directly detect whether the amount of heat of combustion of PM has become excessive based on the trend in change of temperature of the filter backflow gas temperature $T_{GAS}$. For this reason, it is possible to keep fuel cut control from ending up being forcibly ended regardless of the amount of heal of combustion of the PM falling in the allowable range and the filter temperature not being liable to excessively rise. Therefore, it is possible to keep the total time of performance of fuel cut control during one trip from ending up becoming shorter.

Therefore, in the present embodiment if the exhaust temperature sensor 54 is not malfunctioning, it is judged whether to forcibly end fuel cut control bused on the trend in change of temperature of the filter backflow gas temperature $T_{GAS}$ when performing fuel cut control. Further, if the exhaust temperature sensor 54 is malfunctioning, as an exception, the fuel cut control is forcibly ended when the fuel cut time becomes equal to or greater titan the allowable fuel cut time.

Below, referring to FIG. 3 to FIG. 7, the fuel cut control according to the present embodiment will be explained.

FIG. 3 is a flow chart explaining control for setting a fuel cut condition standing flag F1. The electronic control unit 200 repeatedly performs the present routine during operation of the internal combustion engine 100 by a predetermined processing period Δt (for example, 10 ms).

At step S10, the electronic control unit 200 judges whether a condition for performance of fuel cut stands. As the condition for performance of fuel cut, for example, the amount of depression of the accelerator pedal being zero, the engine speed being equal to or greater than a predetermined speed, the vehicle speed being equal to or greater than a predetermined speed, etc. may be mentioned. If the condition for performance of fuel cut stands, the electronic control unit 200 proceeds to the processing of step S11. On the other hand, if the condition for performance of fuel cut does not stand, the electronic control unit 200 proceeds to the processing of step S12.

At step S11, the electronic control unit 200 sets the fuel cut condition standing flag F1 to "1". The fuel cut condition standing flag F1 is a flag set to "1" when the fuel cut condition stands. The initial value is set to "0".

At step S12, the electronic control unit 200 sets the fuel cut condition standing flag F1 to "0".

FIG. 4 is a flow chart explaining control for setting a fuel cut prohibit flag F2. The electronic control unit 200 repeatedly performs the present routine during operation of the internal combustion engine 100 by a predetermined processing period Δt (for example, 10 ms).

At step S20, the electronic control unit 200 calculates an estimated amount of PM deposition $Q_{PM}$. In the present embodiment, the electronic control unit 200 refers to a map prepared in advance by experiments etc. and calculates the estimated amount of PM deposition $Q_{PM}$ based on the filter differential pressure.

At step S21, the electronic control unit 200 calculates the estimated filter temperature $T_{FIL}$. In the present embodiment, the electronic control unit 200 reads in the detected values of the various estimation use parameters for estimating the filter temperature during engine operation and calculates the estimated filter temperature $T_{FIL}$ based on the detected values of the estimation parameters. During engine operation, the filter temperature changes mainly due to the effect of the heat of exhaust, so, for example, it is possible to suitably select and use as the estimation use parameter one or more parameters selected from the engine speed or engine load, engine water temperature, intake amount, and other parameters affecting the amount of heat energy of the exhaust. Note that the estimated filter temperature $T_{FIL}$ is not limited to being calculated by such a method. For example, it may be calculated utilizing the detected value of the exhaust temperature sensor 54 or otherwise estimated by suitable selection of one of various known techniques.

Figure 5:
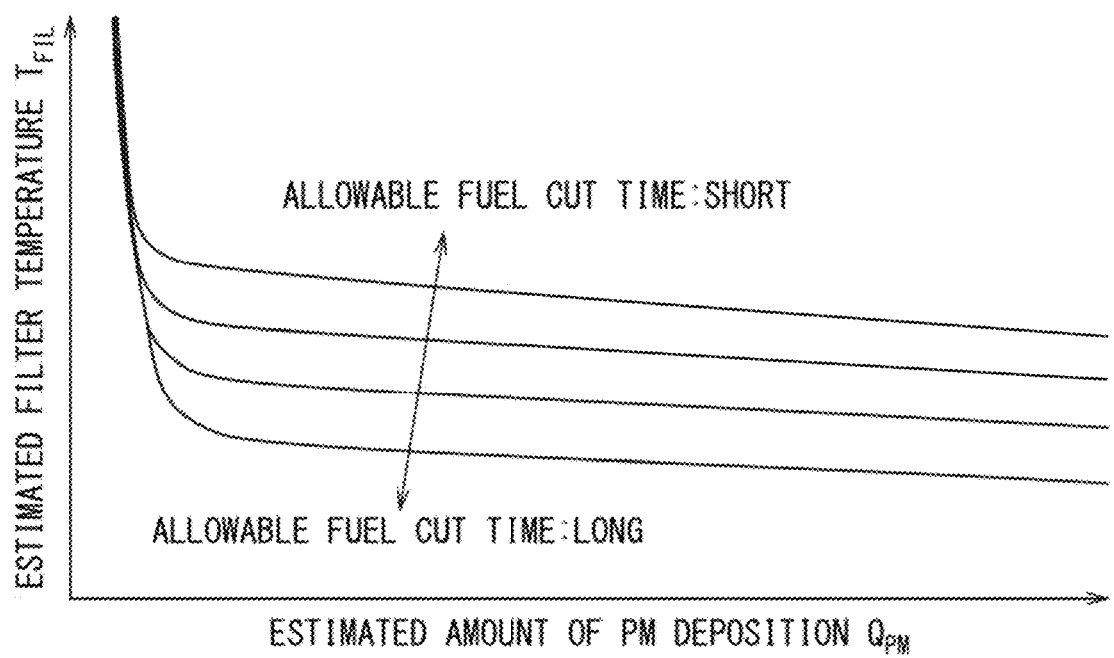
FIG. 5 is an example of a map for calculating an allowable fuel cut time based on an estimated amount of PM deposition $Q_{PM}$ and an estimated filter temperature $T_{FIL}$.

At step S22, the electronic control unit 200 refers to the map of FIG. 5 prepared in advance by experiments etc. and calculates the allowable fuel cut time based on the estimated amount of PM deposition $Q_{PM}$ and the estimated filter temperature $T_{FIL}$. As shown in FIG. 5, the allowable fuel cut time becomes shorter when the estimated filter temperature $T_{FIL}$ is high compared to when it is low. Further, the allowable fuel cut time becomes shorter when the estimated amount of PM deposition $Q_{PM}$ is large compared to when it is small.

At step S23, the electronic control unit 200 judges if the allowable fuel cut time is less than a predetermined lime. If the allowable fuel cut time is less than the predetermined time, the electronic control unit 200 proceeds to the processing of step S24 to prohibit performance of fuel cut control in advance. On the other hand, if the allowable fuel cut time is equal to or greater than the predetermined time, the electronic control unit 200 proceeds to the processing of step S25.

Note that performance of fuel cut control is prohibited in advance when the allowable fuel cut time is less than the predetermined $T_{FIL}$ due to the following reason.

Referring to FIG. 5, as explained above, the allowable fuel cut time tends to become shorter the higher the estimated filter temperature $T_{FIL}$ or the greater the estimated amount of PM deposition $Q_{PM}$. For this reason, if the allowable fuel cut time is extremely short, after starting fuel cut control, the amount of heat of combustion of PM is liable to immediately become excessive and the filter temperature to excessively rise. That is, the trend in change of temperature of the filter backflow gas temperature $T_{GAS}$ is liable to immediately switch from a decreasing trend to an increasing trend after starting fuel cut control and is liable to immediately necessitate forcibly ending the fuel cut control after starting fuel cut control.

If forcibly making fuel cut control end, it is necessary to make the air-fuel mixture burn in the cylinders 11 in a range enabling deceleration of tire vehicle whereby the engine output torque is generated. For this reason, when forcibly making fuel cut control end, torque fluctuation occurs and the drivability deteriorates. Therefore, in the present embodiment, when the allowable fuel cut time is less than a predetermined time, that is, when, if performing fuel cut control, the possibility is high of having to forcibly end the fuel cut control, performance of fuel cut control is made to be prohibited in advance so as to prevent deterioration of the drivability (occurrence of torque fluctuation).

At step S24, the electronic control unit 200 sets the fuel cut prohibit flag F2 to "1". The fuel cut prohibit flag F2 is a flag set to "1" T while prohibiting fuel cut control. The initial value is "0".

At step S25, the electronic control unit 200 sets the fuel cut prohibit flag F2 to "0".

At step S26, the electronic control unit 200 judges if the fuel cut condition standing flag F1 is set to "1". If the fuel cut condition standing flag F1 is set to "1", the electronic control unit 200 proceeds to the processing of step S27. On the other hand, if the fuel cut condition standing flag F1 is set to "0", the electronic control unit 200 ends the current processing.

At step S27, the electronic control unit 200 judges whether the previous value of the fuel cut condition standing flag F1 was "0", that is, whether it is right after the fuel cut condition stands (whether it is first processing after fuel cut condition stands). If the previous value of the fuel cut condition standing flag F1 was "0", the electronic control unit 200 proceeds to the processing of step S28. On the other hand, if the previous value of the fuel cut condition standing flag F1 was "1", the electronic control unit 200 ends the current processing.

At step S28, the electronic control unit 200 stores the allowable fuel cut time calculated at step S22 in the current processing, that is, the allowable fuel cut time calculated right after the fuel cut condition stands, as a threshold value far judgment of end of fuel cut in the memory.

Figure 6:
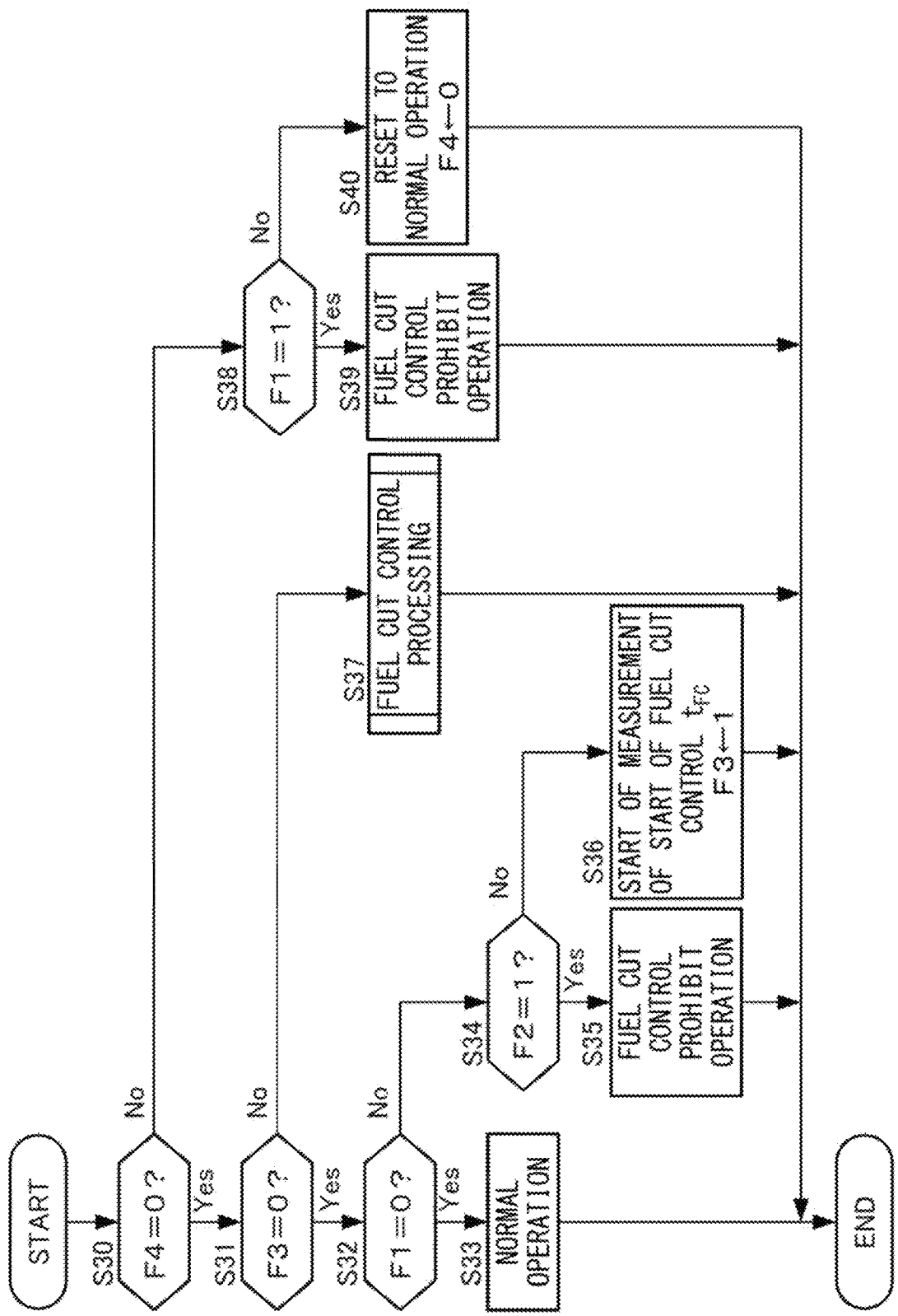
FIG. 6 is a flow chart explaining fuel cut control according to a first embodiment of the present disclosure.
Figure 7:
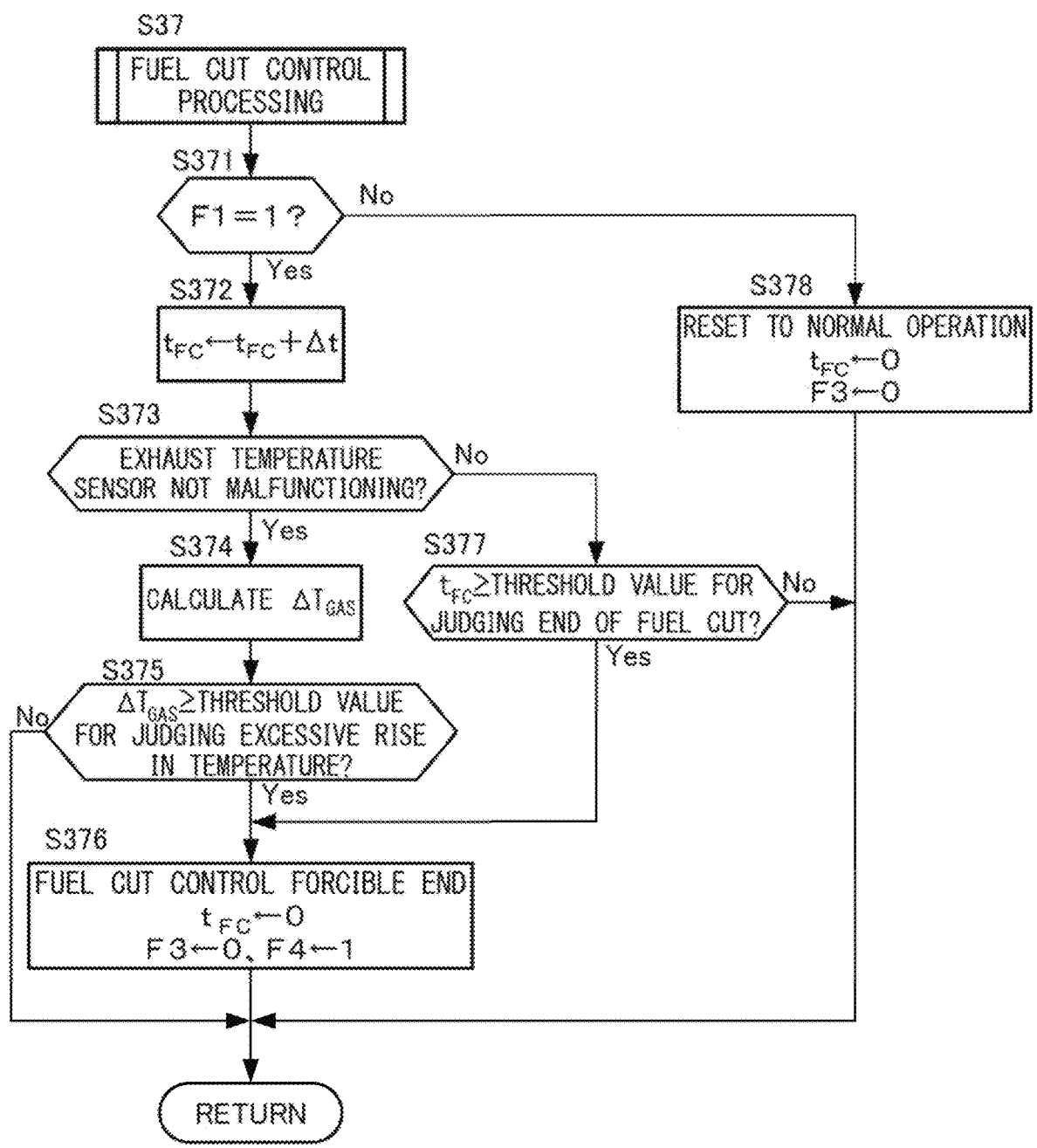
FIG. 7 is a flow chart explaining details of fuel cut control processing according to the first embodiment of the present disclosure.

FIG. 6 is a flow chart explaining fuel cut control according to the present embodiment. The electronic control unit 200 repeatedly performs the present routine during operation of the internal combustion engine 100 by a predetermined processing period Δt (for example, 10 ms).

At step S30, the electronic control unit 200 judges whether a fuel cut forcible end flag F4 is set to "0". The fuel cut forcible end flag F4 is a flag set to "1" when fuel cut control has been forcibly ended. The initial value is set to "0". If the fuel cut forcible end flag F4 is set to "0", the electronic control unit 200 proceeds to the processing of step S31. On the other hand, if the fuel cut forcible end flag F4 is set to "1" the electronic control unit 200 proceeds to the processing of step S38.

At step S31, the electronic control unit 200 judges whether the fuel cut progress flag F3 is set to "0". The fuel cut progress flag F3 is a flag which is set to "1" at the time of start of fuel cut control and is returned to "0" at the end. The initial value is set to "0". If the fuel cut progress flag F3 is "0", the electronic control unit 200 proceeds to the processing of step S32. On the other hand, if the fuel cut progress flag F3 is set to "1" the electronic control unit 200 proceeds to the processing of step S37.

At step S32, the electronic control unit 200 judges whether the fuel cut condition standing flag F1 is set to "0". If the fuel cut condition standing flag F1 is set to "0" (if fuel cut condition does not stands), the electronic control unit 200 proceeds to the processing of step S33. On the other hand, if the fuel cut condition standing flag F1 is set to "1" (if the fuel cut condition stands), the electronic control unit 200 proceeds to the processing of step S34.

At step S33, the electronic control unit 200 operates the internal combustion engine 100 normally. That is, the electronic control unit 200 makes an air-fuel mixture with an air excess rate λ of 1 burn inside the cylinders 11 to operate the internal combustion engine 100 so that the engine output torque becomes a target torque corresponding to the engine load.

At step S34, the electronic control unit 200 judges whether fuel cut control is prohibited, that is, if the fuel cut prohibit flag F2 is set to "1". If the fuel cut control is prohibited (if fuel cut prohibit flag F2 is set to "1"), the electronic control unit 200 proceeds to the processing of step S35. On the other hand, if fuel cut control is not prohibited (if fuel cut prohibit flag F2 is set to "0"), the electronic control unit 200 proceeds to the processing of step S36.

At step S35, while the fuel cut condition stands, the allowable fuel cut time is less than the predetermined time and fuel cut control is prohibited, so the electronic control unit 200 operates the engine while prohibiting fuel cut control. Specifically, the electronic control unit 200 does not perform fuel cut control but operates the internal combustion engine 100 by making an air-fuel mixture burn in the cylinders 11 within a range enabling deceleration of the vehicle.

At step S36, the electronic control unit 200 starts the fuel cut control and starts measuring the fuel cut time $t_{FC}$. Further, the electronic control unit 200 together with this sets live fuel cut progress flag F3 to "1".

At step S37, the electronic control unit 200 performs fuel cut control processing. Details of the fuel cut control processing will be explained with reference to FIG. 7.

At step S371, the electronic control unit 200 judges whether the fuel cut condition stands, that is, whether the fuel cut condition standing flag F1 is set to "1". If the fuel cut condition stands (if fuel cut condition standing flag F1 is set to "1"), the electronic control unit 200 proceeds to the processing of step S372. On the other hand, if the fuel cut condition does not stand (if the fuel cut condition standing flag F1 is set to "0"), the electronic control unit 200 proceeds to the processing of step S378.

At step S372, the electronic control unit 200 adds the processing period Δt to the fuel cut time $t_{FC}$ to update the fuel cut time $t_{FC}$.

At step S73, the electronic control unit 200 judges whether the exhaust temperature sensor 54 is malfunctioning. In the present embodiment, for example, when disconnection of the cable of the exhaust temperature sensor 54 is detected or when the detected value of the exhaust temperature sensor 54 is stuck at the upper limit value or lower limit value, the electronic control unit 200 judges that the exhaust temperature sensor 54 is malfunctioning. If the exhaust temperature sensor 54 is not malfunctioning, the electronic control unit 200 proceeds to the processing of step S374. On the other hand, if the exhaust temperature sensor 54 is malfunctioning, the electronic control unit 200 proceeds to the processing of step S377.

At step S374, the electronic control unit 200 calculates the amount of change of temperature $\Delta T_{GAS}$ of the filter backflow gas temperature $T_{GAS}$ so as to detect the trend in change of temperature of the filter backflow gas temperature $T_{GAS}$. In the present embodiment, the electronic control unit 200 calculates the difference between the filter backflow gas temperature $T_{GAS}$ the current processing and the filter backflow gas temperature $T_{GAS}$ in the previous processing as the amount of change of temperature $\Delta T_{GAS}$.

At step S375, the electronic control unit 200 judges whether the amount of change of temperature $\Delta T_{GAS}$ has become equal to or greater than the predetermined threshold value for judgment of excessive rise of temperature. If the amount of change of temperature $\Delta T_{GAS}$ is equal to or greater than the threshold value for judgment of excessive rise of temperature, the electronic control unit 200 judges that a large amount of PM has started being burned all at once or otherwise a sign of the amount of heat of combustion of PM becoming excessive has appeared and that if continuing fuel cut control in this way, the filter temperature is liable to excessively rise and become higher than the guaranteed durability temperature $T_{UP}$ and proceeds to the processing of step S376. On the other hand, if the amount of change of temperature $\Delta T_{GAS}$ is less than the threshold value for judgment of excessive rise of temperature, the electronic control unit 200 judges there is no such a liability and ends the current processing, then continues the fuel cut control.

The magnitude of the threshold value for judgment of excessive rise of temperature compared with the amount of change of temperature $\Delta T_{GAS}$ is made a magnitude by which it can be judged that the trend in change of temperature of the filter backflow gas temperature $T_{GAS}$ will switch or has switched from a decreasing trend to an increasing trend. In the present embodiment, to judge that the trend in change of temperature of the filter backflow gas temperature $T_{GAS}$ has actually switched from a decreasing trend to an increasing trend, the magnitude of the threshold value for judgment of excessive rise of temperature is set to 10° C. but other than this as well, for example, it is also possible to judge the instant that the trend in change of temperature switches from a decreasing trend to an increasing trend or a sign of the same as a value near 0° C.

At step S376, the electronic control unit 200 forcibly makes the fuel cut control end and sets the fuel cut forcible end flag F4 to "1". Further, the electronic control unit 200 also ends the measurement of the fuel cut time $t_{FC}$ and returns the value to zero and returns the fuel cut progress flag F3 to "0".

At step S377, the electronic control unit 200 judges if the fuel cut time $t_{FC}$ has become equal to or greater than the threshold value for judgment of end of fuel cut (allowable fuel cut time calculated right after start of fuel cut control) because the exhaust temperature sensor 54 malfunctioned and cannot detect the change of temperature of the filter backflow gas temperature $T_{GAS}$. If the fuel cut time $t_{FC}$ is equal to or greater than the threshold value for judgment of end of fuel cut, the electronic control unit 200 proceeds to the processing of step S366 to forcibly end the fuel cut control. On the other hand, if the fuel cut time $t_{FC}$ is less than the threshold value for judgment of end of fuel cut, the electronic control unit 200 ends the current processing and makes the fuel cut control continue.

At step S378, the electronic control unit 200 ends the fuel cut control and resets normal operation. Further, the electronic control unit 230 also ends measurement of the fuel cut time $t_{FC}$, returns the value to zero, and returns the feel cut progress flag F3 to "0".

Returning to FIG. 6, at step S38, the electronic control unit 200 judges whether the fuel cut condition stands, that is, whether the fuel cut condition standing flag F1 has been set to "1". If the fuel cut condition stands (if the fuel cut condition standing flag F1 is set to "1"), the electronic control unit 200 proceeds to the processing of step S39. On the other hand, if the fuel cut condition does not stand (if the fuel cut condition standing flag F1 is set to "0"), the electronic control unit 200 proceeds to the processing of step S40.

At step S39, the fuel cut condition stands, but a need arises to forcibly make the fuel cut control end, so the electronic control unit 200 performs a fuel cut control prohibit operation. That is, the electronic control unit 200 makes the air-fuel mixture in the cylinders 11 burn to operate the internal combustion engine 100 in a range enabling the vehicle to be made to decelerate.

At step S40, the electronic control unit 200 resets the fuel cut control prohibit operation to normal operation and returns the fuel cut forcible end flag F4 to "0".

Figure 8:
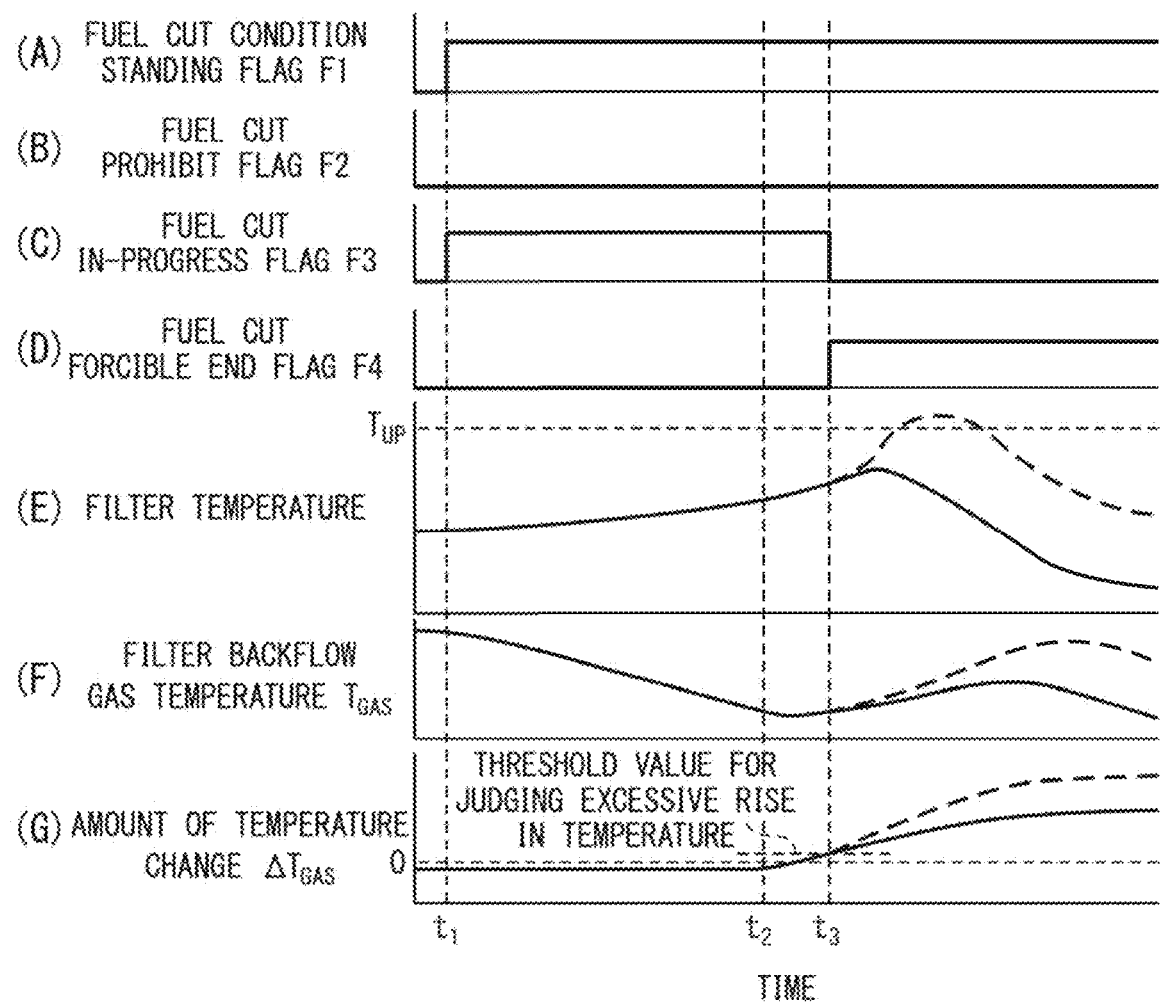
FIG. 8 is a time chart explaining the operation of fuel cut control according to the first embodiment of the present disclosure.

FIG. 8 is a time chart explaining the operation of fuel cut control according to the present embodiment. In FIG. 8, the operation in the case where fuel cut control according to the present embodiment is shown by a solid line.

In the example of FIG. 8, at the time t1, the fuel cut condition stands and fuel cut control is started, while at the time t2, a large amount of PM starts to burn all at once, the amount of heat of combustion of PM becomes excessive, and the trend in chance of temperature of the filler backflow gas temperature $T_{GAS}$ starts to switch from a decreasing trend to an increasing trend. As a result, at the time t3, the amount of change of temperature $\Delta T_{GAS}$ becomes equal to or greater than the threshold value for judgment of excessive rise of temperature and the fuel cut control is forcibly ended. At time t3 on, until the fuel cut condition no longer stands (until fuel cut condition standing flag F1 is returned to "0"), a fuel cut prohibit operation is performed.

Due to this, at the time t3 on, air no longer flows inside the PM trapping device 50 and the PM can no longer be made to burn, so it is possible to keep the filter temperature from excessively rising and ending up becoming higher than the guaranteed durability temperature $T_{UP}$.

The internal combustion engine 100 according to the above-explained present embodiment is provided with an engine body 10, a filter 52 provided in an exhaust pipe 22 (exhaust passage) of the engine body 10 and trapping particulate matter in the exhaust, and an exhaust temperature sensor 54 (temperature sensor) provided in the exhaust pipe 22 at a downstream side from the filter 52 in a direction of flow of exhaust and detecting a temperature of gas flowing out from the filter 52. Further, the electronic control unit 200 (control device) controlling this internal combustion engine 100 is provided with a fuel cut control pan performing fuel cut control stopping a supply of fuel to a combustion chamber of the engine body 10 and a forced ending part forcibly making the fuel cut control end, even if a condition for performance of fuel cut control had stood, based on a trend in change of temperature of the filter backflow gas temperature $T_{GAS}$ detected by the exhaust temperature sensor 54.

For this reason, according to the present embodiment, it is possible to directly detect whether an amount of heat of combustion of PM has become excessive based on the trend in change of temperature of the filter backflow gas temperature $T_{GAS}$. For this reason, it is possible to keep fuel cut control from ending up forcibly ended despite the amount of heal of combustion of PM falling in an allowable range and the filler temperature not liable to excessively rise. Therefore, it is possible to keep the total time of performance of fuel cut control in one trip from ending up becoming shorter and possible to keep the opportunities for burning off the PM trapped at the filter 52 from ending up being reduced.

The forced ending part according to the present embodiment specifically is configured to forcibly make the fuel an control end when reaching a predetermined timing at which it is possible to judge that the trend in change of temperature of the gas temperature will switch or has switched from a decreasing trend to an increasing trend. The predetermined tinting is the timing at which the amount of change of temperature $\Delta T_{GAS}$ of the filter backflow gas temperature $T_{GAS}$ becomes equal to or greater than the threshold value for judgment of excessive rise of temperature (predetermined amount). In the present embodiment, the threshold value for judgment of excessive rise of temperature is made 10° C.

Further, the electronic control unit 200 according to the present embodiment is further provided with an allowable fuel cut lime calculating part calculating, based on the estimated filler temperature $T_{FIL}$ and the estimated amount of PM deposition $Q_{PM}$, an allowable fuel cut lime comprised of a time of performance of fuel cut control at which the temperature of the filler 52 is not liable to become equal to or greater than the guaranteed durability temperature $T_{UP}$ (predetermined temperature) at which the filter 52 is liable to be made to deteriorate if performing fuel cut control and a fuel cut control prohibiting part prohibiting in advance performance of fuel cut control when the allowable fuel cut lime is less than a predetermined time.

Due to this, when the allowable fuel cut time is less than a predetermined time, that is, when if performing fuel cut control there is a high possibility of fuel cut control having to forcibly be ended immediately, performance of fuel cut control is prohibited in advance, so it is possible to keep the drivability from deteriorating due to torque fluctuation occurring when forcibly making fuel cut control end.

Second Embodiment

Next, a second embodiment of the present disclosure will be explained. The present embodiment differs from the first embodiment on the point of using, as the parameter showing the trend in change of temperature of lire filter backflow gas temperature $T_{GAS}$, the rate of change by time (time derivative) was of the filter backflow gas temperature $T_{GAS}$. Below, this point of difference will be focused on in the explanation.

Figure 9:
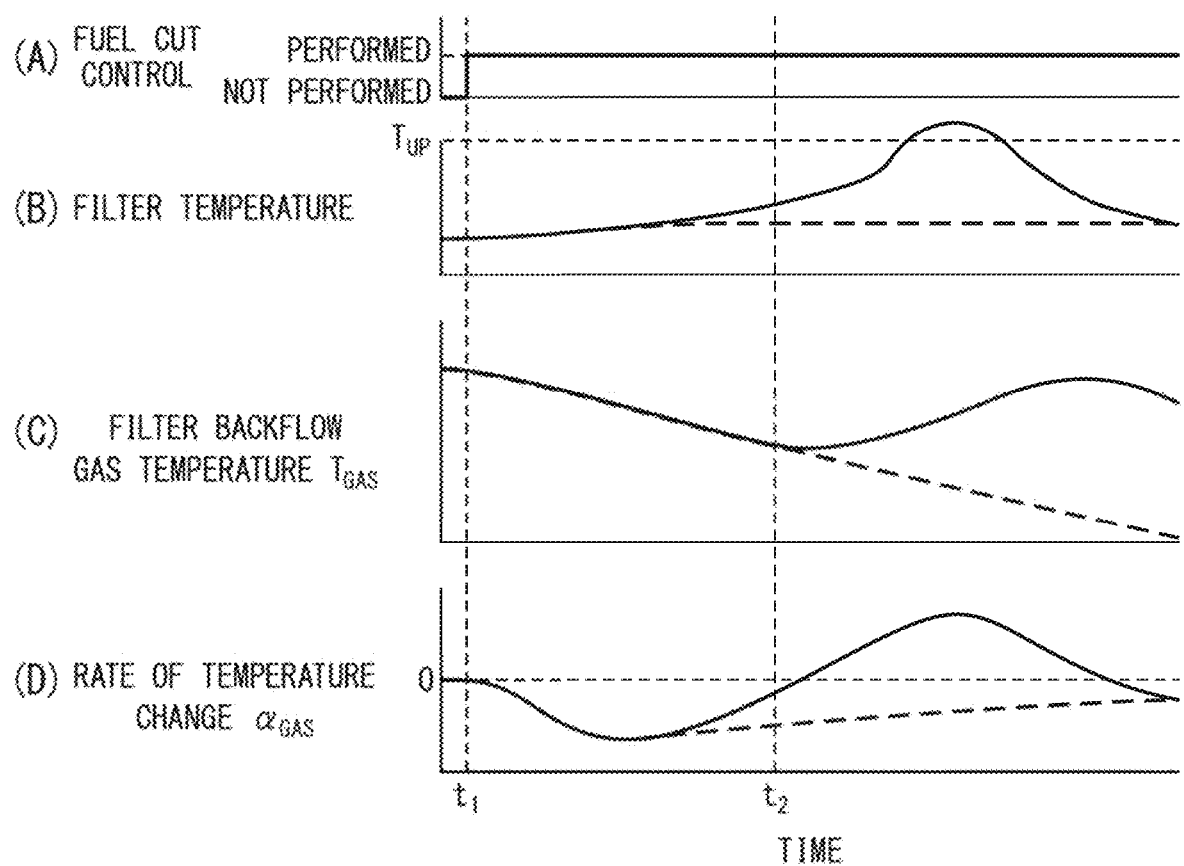
FIG. 9 is a view showing changes in temperature etc. of a filler backflow gas temperature in a case where an amount of heat of combustion of PM during fuel cut control becomes excessive (solid line) and a case where that does not become so (broken line) etc.

FIG. 9, like FIG. 2, is a view showing changes in temperature etc. of the filter backflow gas temperature in a case where an amount of heat of combustion of PM during fuel cut control becomes excessive (solid line) and a case where it does not (broken line) etc. It differs from FIG. 2 on the point of showing the rate of change by time $\alpha_{GAS}$ of the filter backflow gas temperature $T_{GAS}$ instead of the amount of change of temperature $\Delta T_{GAS}$ of the filter backflow gas temperature $T_{GAS}$.

As shown in FIG. 9(D), as the parameter showing the change of temperature of the filter backflow gas temperature $T_{GAS}$, instead of the amount of change of temperature $\Delta T_{GAS}$ of the filter backflow gas temperature $T_{GAS}$, it is also possible to detect the rate of change by time $\alpha_{GAS}$ of the filter backflow gas temperature $T_{GAS}$ (=$T_{GAS}$ (current value)-$T_{GAS}$ (previous value))/$\Delta t$) to detect an inflection point where the trend in change of temperature of the filter backflow gas temperature $T_{GAS}$ starts to switch from a decreasing trend to an increasing trend (that is, point where the rate of change by time was becomes zero). Therefore, when the rate of change by time $\alpha_{GAS}$ becomes equal to or greater than a predetermined threshold value for judgment of excessive rise of temperature (for example, zero), it can be judged that the amount of heat of combustion of PM has become excessive. For this reason, if forcibly making the fuel cut control end at this point of time, in the same way as the first embodiment, it is possible to keep the situation from arising of the filler temperature excessively rising and ending up becoming higher than the guaranteed durability temperature $T_{UP}$.

Figure 10:
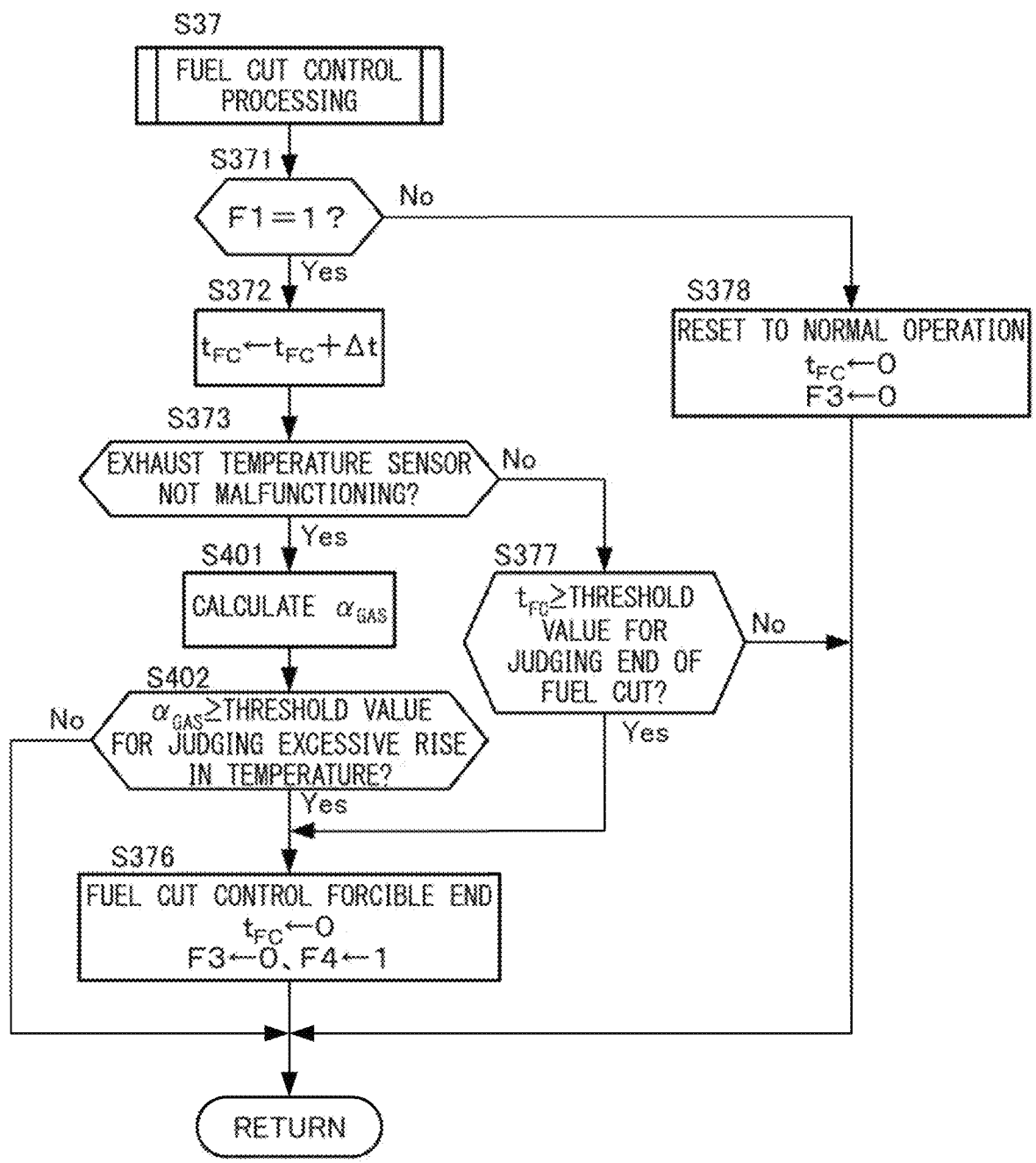
FIG. 10 is a flow chart explaining details of fuel cut control processing according to a second embodiment of the present disclosure.

FIG. 10 is a flow chart explaining details of fuel cut control processing according to the present embodiment. Note that, in FIG. 10, the contents of the processing of step S371 to step S378 are similar to the first embodiment, so here explanations will be omitted.

At step S401, the electronic control unit 200 calculates the rate of change by time $\alpha_{GAS}$ of the filter backflow gas temperature $T_{GAS}$(=(current value)-$T_{GAS}$ (previous value))/$\Delta t$).

At step S402, the electronic control unit 200 judges whether the rate of change by time $\alpha_{GAS}$ has become a predetermined threshold value for judgment of excessive rise of temperature (for example, zero). If the rate of change by time $\alpha_{GAS}$ is equal to or greater than the threshold value for judgment of excessive rise of temperature, a large amount of PM starts to burn all at once or otherwise a sign appears of the amount of heat of combustion of PM becoming excessive and the electronic control unit 200 judges that if continuing fuel cut control as is, the filter temperature is liable to excessively rise and become higher than the guaranteed durability temperature $T_{UP}$ and proceeds to the processing of step S376. On the other hand, if the rate or change by time $\alpha$ is less than the threshold value for judgment of excessive rise of temperature, the electronic control unit 200 can judge that there is no such liability of that, ends the current processing, and makes the fuel cut control continue.

The magnitude of the threshold value for judgment of excessive rise of temperature which is compared with the rate of change by time $\alpha_{GAS}$ is made a magnitude at which it can be judged that the trend in change of temperature of the filter backflow gas temperature $T_{GAS}$ will switch or has switched from a decreasing trend to an increasing trend, for example, can be made any value in a range from −1 to 1.

In this way, even if using as the parameter showing the trend of the change of temperature of the filter backflow gas temperature $T_{GAS}$, the rate of change by time $\alpha_{GAS}$ instead of the amount of change of temperature $\Delta T_{GAS}$ of the Alter backflow gas temperature $T_{GAS}$, it is possible to obtain an action and effect similar to the first embodiment.

Third Embodiment

Next, a third embodiment of the present disclosure will be explained. The present embodiment differs from the above embodiments on the point of forcibly making the fuel cut control end as an exception when the fuel cut lime has become equal to or greater than the allowable fuel cut time even if the detected value of the exhaust temperature sensor 54 is low in reliability regardless of whether the exhaust temperature sensor 54 has been malfunctioning. Below, this point of difference will be focused on in the explanation.

In the above-mentioned embodiments, if the exhaust temperature sensor 54 is not malfunctioning, it was judged whether to forcibly make the fuel cut control end based on the trend of the change of temperature of the filter backflow gas temperature $T_{GAS}$ when performing fuel cut control and, if wires are disconnected, the sensor is stuck, or otherwise it can be judged that the exhaust temperature sensor 54 is clearly malfunctioning, the fuel cut control was forcibly made to end as an exception when the fuel cut lime becomes equal to or greater than the allowable fuel cut time.

As opposed to this, the present embodiment cannot judge that the exhaust temperature sensor 54 has clearly malfunctioned, but even if some sort of issue is liable to have arisen in the exhaust temperature sensor 54, that is, the exhaust temperature sensor 54 falls in reliability of detected value, as an exception, it is made to forcibly make the fuel cut control end if the fuel cut time has become equal to or greater than the allowable fuel cut time.

As one example of the case where the exhaust temperature sensor 54 is low in reliability of detected value, for example, the case where the trend in change of temperature itself of the filter backflow gas temperature $T_{GAS}$ after fuel cut control has been started is a decreasing trend, but the case where the degree of decrease is abnormally large etc. may also be mentioned. Normally, the air flowing into the PM trapping device 50 after fuel cut control is started is heated inside the PM trapping device 50 by heat exchange with the filter 52 and the heal of combustion of the PM, so the degree of decrease of the filter backflow gas temperature $T_{GAS}$ is restrained to a certain degree. Therefore, if the degree of decrease of the filter backflow gas temperature $T_{GAS}$ is abnormally large, some sort of issue is liable to have arisen in the exhaust temperature sensor 54. This is because the exhaust temperature sensor 54 may be low in reliability of detected value.

Below, referring to FIG. 11, details of the fuel cut control processing according to the present embodiment will be explained.

Figure 11:
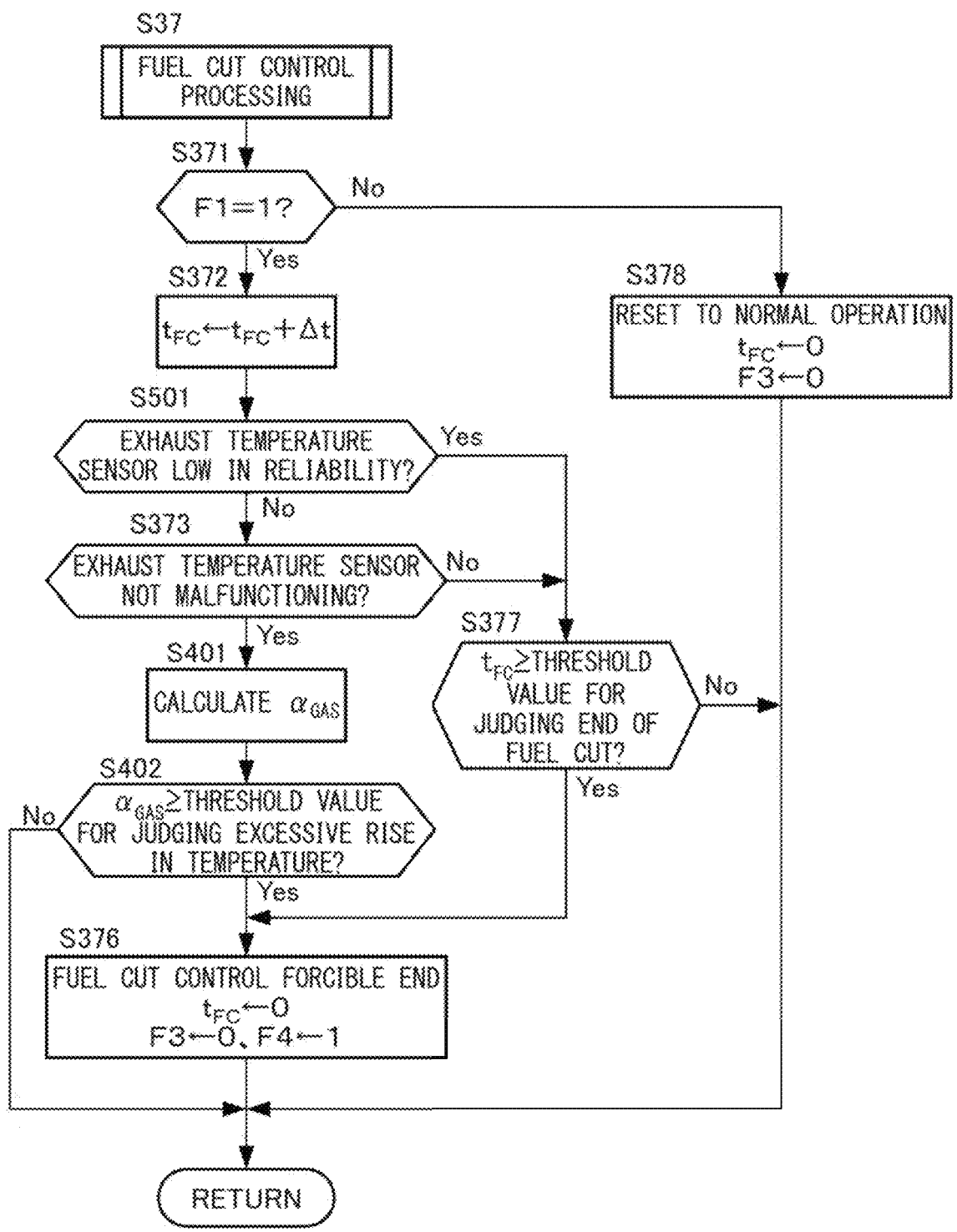
FIG. 11 is a flow chart explaining detail of fuel cut control processing according to a third embodiment of the present disclosure.

FIG. 11 is a flow chart explaining details of fuel cut control processing according to the present embodiment. Note that, in FIG. 11, the contents of the processing other than step S501 have already been explained, so here explanations will be omitted.

At step S501, the electronic control unit 200 judges whether the exhaust temperature sensor 54 is low in reliability. In the present embodiment, if the difference between the filter backflow gas temperature $T_{GAS}$ at the time of start of fuel cut control and the current filter backflow gas temperature $T_{GAS}$ is equal to or greater than a predetermined value, the degree of decrease of the filter backflow gas temperature $T_{GAS}$ (speed of decrease) becomes abnormally large, so the electronic control unit 200 judges that the exhaust temperature sensor 54 is low in reliability. If the exhaust temperature sensor 54 is low in reliability, the electronic control unit 200 proceeds to the processing of step S377. As an exception, it forcibly makes the fuel cut control end when the fuel cut time becomes equal to or greater than the allowable fuel cut time. On the oilier hand, if the exhaust temperature sensor 54 is not low in reliability, the electronic control unit 200 proceeds to the processing of step S373.

According to the above-explained present embodiment, if the reliability of the detected value of the exhaust temperature sensor 54 is low, regardless of a sign appearing of the amount of heat of combustion of PM becoming excessive, there is a possibility of that sign no longer being able to be detected by the exhaust temperature sensor 54, but in this case, the fuel cut control is forcibly made to end when the fuel cut time becomes equal to or greater than the allowable fuel cut time, so it is possible to keep the filter temperature from excessively rising and the filter 52 from ending up deteriorating.

Fourth Embodiment

Next, a fourth embodiment of the present disclosure will be explained. The present embodiment differs from the above embodiments on the point of being made to set a time for stopping judgment (judgment timeout time) if judging an excessive temperature rise in accordance with the change of temperature of the filter backflow gas temperature $T_{GAS}$. Below, this point of difference will be focused on in the explanation.

The air flowing into the PM trapping device 50 after fuel cut control is started is healed inside the PM trapping device 50 by exchange of heat with tire filter 52 and the heat of combustion of the PM while flowing out from the PM trapping device 50. The trend in change of temperature of the filter backflow gas temperature $T_{GAS}$ at this time, as explained above referring to FIG. 2, basically becomes a decreasing trend while the amount of heat of combustion of PM falls in the allowable range. However, if fuel cut control continues for a long time, the filter backflow gas temperature $T_{GAS}$ eventually converges to a certain constant temperature corresponding to tire outside air temperature.

If the filter backflow gas temperature $T_{GAS}$ converges to a certain constant temperature and the change of temperature of the filter backflow gas temperature $T_{GAS}$ is eliminated, the amount of change of temperature $\Delta T_{GAS}$ and the rate of change by time $\alpha_{GAS}$ become zero, so, for example, if making the threshold value for judgment of excessive rise of temperature zero, there is a possibility of mistakenly judging that an excessive rise of temperature is liable to occur regardless of an excessive rise of temperature not being liable to occur.

Therefore, the present embodiment is made to set the judgment timeout lime based on the estimated filter temperature $T_{FIL}$ and the estimated amount of PM deposition $Q_{PM}$ at the time of start of fuel cut control. The judgment timeout time is the time after fuel cut control is started to when the change of temperature of the filter backflow gas temperature $T_{GAS}$ becomes constant and can be found in advance by experiments etc. The judgment timeout time tends to become longer when the filter temperature is high compared to when it is low. Further, the judgment timeout time tends to become longer when the amount of PM deposition is large compared to when it is small.

Figure 12:
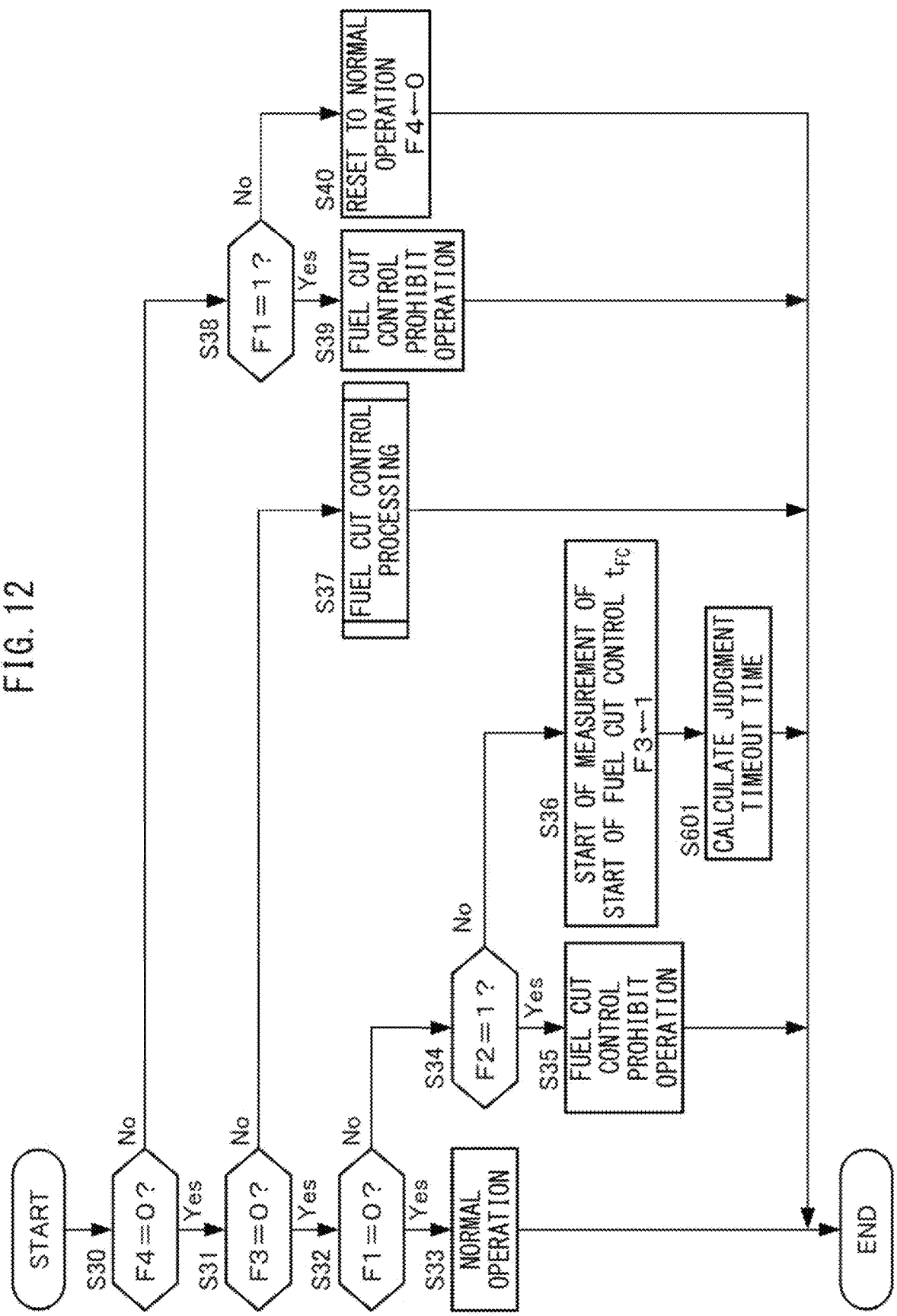
FIG. 12 is a flow chart explaining fuel tut control according to a fourth embodiment of the present disclosure.

FIG. 12 is a flow chart explaining fuel cut control according to the present embodiment. The electronic control unit 200 repeatedly performs the present routine during operation of the internal combustion engine 100 by a predetermined processing period $\Delta t$ (for example, 10 ms). Note that, in FIG. 12, the content of the processing from step S30 to step S40 is similar to the first embodiment, so here explanations will be omitted.

At step S601, the electronic control unit 200 refers to a map etc. prepared in advance by experiments etc. and calculates the judgment timeout lime based on the current estimated filler temperature $T_{FIL}$ and the estimated amount of PM deposition $Q_{PM}$.

Figure 13:
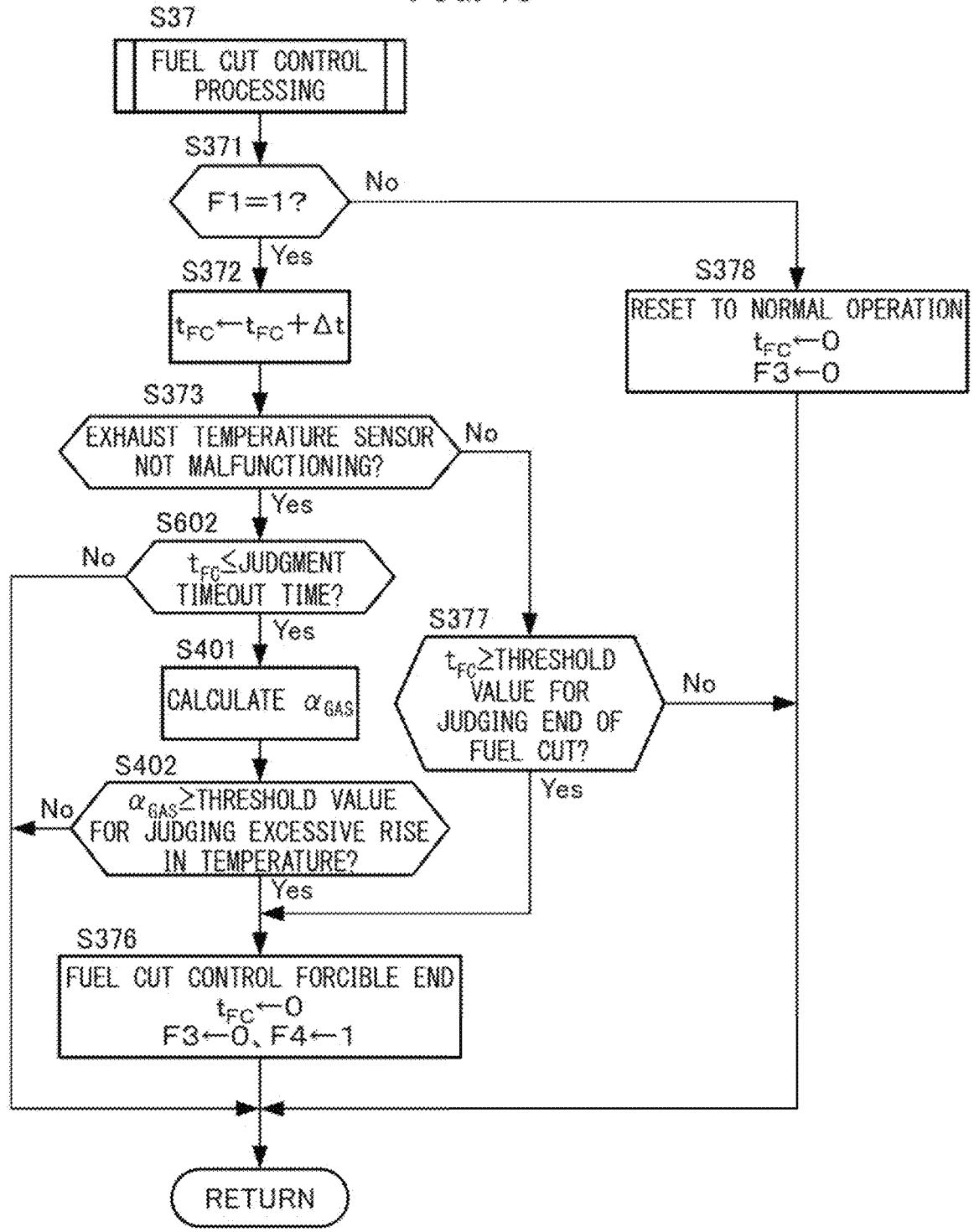
FIG. 13 is a flow chart explaining details of fuel cut control processing according to the fourth embodiment of the present disclosure.

FIG. 13 is a flow chart explaining details of fuel cut control processing according to the present embodiment. Note that, in FIG. 13, the contents of the processing of the steps other than the processing of step S602 are as explained above in the first embodiment and the second embodiment, so here explanations will be omitted.

At step S602, the electronic control unit 200 judges whether the fuel cut time $t_{FC}$ is less than the judgment timeout lime. If the fuel cut lime $t_{FC}$ is less than the judgment timeout time, the electronic control unit 200 proceeds to the processing of step S401. On the other hand, if the fuel cut time $t_{FC}$ equal to or greater than the judgment timeout lime, the electronic control unit 200 ends the current processing.

The above-explained electronic control unit 200 according to the present embodiment is provided with a fuel cut control part, forced ending part, and allowable fuel cut time calculating part similar to the first embodiment and is further provided with a judgment timeout time calculating pan calculating a judgment timeout time until a steady state where the change of temperature of the filter backflow gas temperature $T_{GAS}$ detected by the exhaust temperature sensor 54 becomes less than predetermined based on the estimated filler temperature $T_{FIL}$ and the estimated amount of PM deposition $Q_{PM}$.

Further, the forced ending part according to the present embodiment is configured so that instead of forcibly ending the fuel cut control based on the trend of the change of temperature of the filter backflow gas temperature $T_{GAS}$ detected by the exhaust temperature sensor 54 when the lime of performance of fuel cut control becomes equal to or greater than the judgment timeout time, it forcibly makes the fuel cut control end when the time of performance of fuel cut control becomes equal to or greater than the allowable fuel cut time.

As explained above, if the filter backflow gas temperature $T_{GAS}$ converges to a certain constant temperature and the change of temperature of the filter backflow gas temperature $T_{GAS}$ becomes a steady state, the amount of change of temperature $\Delta T_{GAS}$ and the rate of change by time $\alpha_{GAS}$ become zero, so, for example, if making the threshold value for judgment of excessive rise of temperature zero etc., depending on the setting of the threshold value for judgment of excessive rise of temperature, there is a possibility of mistakenly judging the temperature is liable to excessively rise regardless of the temperature not being liable to excessively rise. Therefore, when, like in the present embodiment, the time of performance of fuel cut control becomes equal to or greater that the judgment timeout time, by forcibly making the fuel cut control end when the time of performance of fuel cut control becomes equal to or greater than the allowable fuel cut time, it is possible to keep it from ending up being mistakenly judged that an excessive rise in temperature is liable to occur while further keeping the filter temperature from ending up being made to excessively rise during fuel cut control.

Fifth Embodiment

Next, a fifth embodiment of the present disclosure will be explained. The present embodiment differs from the fourth embodiment on the point that it corrects the judgment timeout time based on the state of deposition of PM. Below, this point of difference will be focused on in the explanation.

Figure 14:
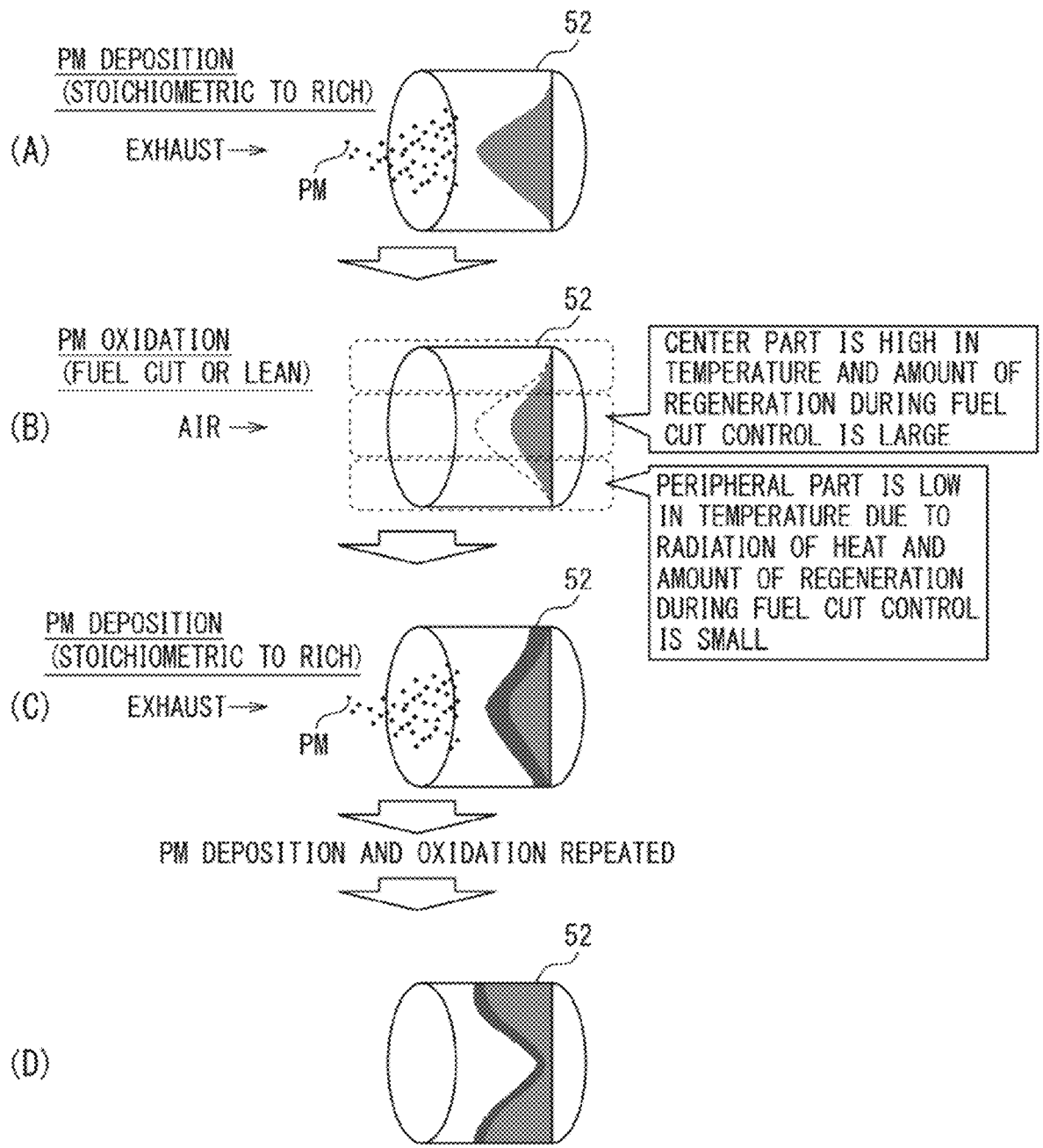
FIG. 14 is a view showing a situation where PM deposits on a filter.

FIG. 14 is a view showing a situation where PM deposits on the filter 52.

As shown in FIG. 14(A), when PM deposits on the filler 52, compared with the peripheral part of the filler, the center part of the filter becomes faster in speed of exhaust, so compared with the peripheral part of the filter, the center part of the filter lends to have a greater amount of PM deposited.

Further, as shown in FIG. 14(B), the filter temperature tends to become higher at the center part of the filter compared with the peripheral part of the filter, so when the inside of the PM trapping device 50 becomes an air atmosphere, the amount burned of the PM deposited at the center part of the filter tends to become greater than the amount burned of the PM deposited at the peripheral part of the filter.

In this way, compared with the center part of the filter, PM has a harder time depositing at the peripheral part of the filter, but the PM deposited at the peripheral part of the filter is difficult to burn. For this reason, if PM is repeatedly deposited and burned by oxidation, as shown in FIG. 14(D), sometimes a large amount of PM deposits at the peripheral part of the filter.

As explained above, the filter temperature of the peripheral part of the filler tends to become lower than the center part of the filter, so when a large amount of PM deposits at the peripheral part of the filler, compared with when a large amount of PM deposits at the center part of the filter, after fuel cut control is started, the time required until the large amount of PM deposited starts to burn all at once also tends to become longer.

Therefore, when in a state where a large amount of PM has deposited at the peripheral part of the filter, unless the judgment timeout time also does not become longer, after the elapse of the judgment timeout time, the large amount of PM deposited at the peripheral part of the filter is liable to start to burn all at once.

Therefore, the present embodiment, for example, estimated the state of deposition of PM in accordance with the estimated amount of PM deposition $Q_{PM}$, the number of times performing fuel cut control, etc. and corrected the judgment timeout time based on the state of deposition of PM. Specifically, the greater the estimated amount of PM deposition $Q_M$ and, further, the greater the number of times the fuel cut control is performed, the greater the possibility of the state becoming one where a large amount of PM deposits at the peripheral part of the filter being judged and the longer the judgment timeout time is corrected to. Below, referring to FIG. 15, the fuel cut control according to the present embodiment will be explained.

Figure 15:
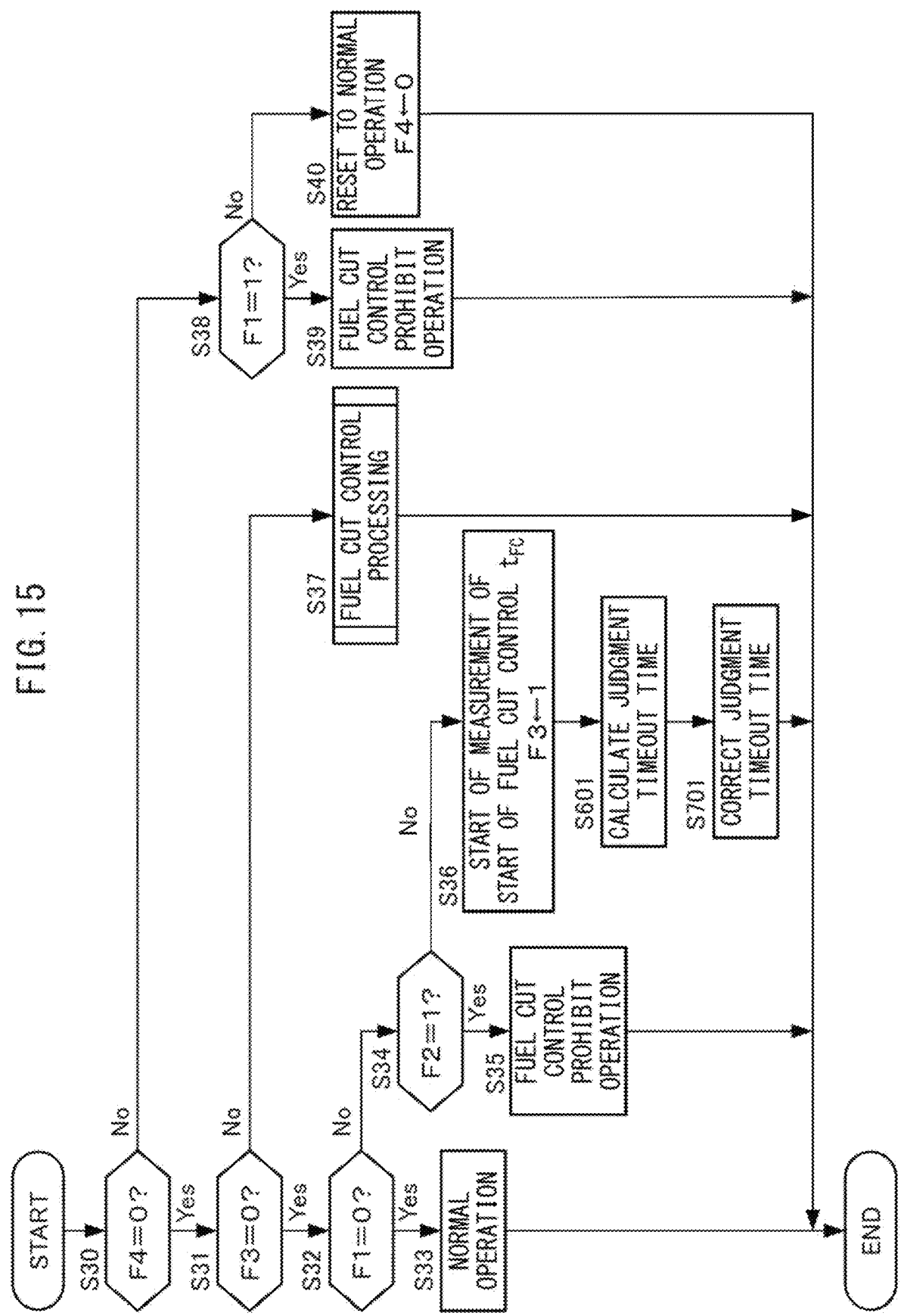
FIG. 15 is a flow chart explaining fuel cut control according to a fifth embodiment of the present disclosure.

FIG. 15 is a flow chart explaining fuel cut control according to the present embodiment. The electronic control unit 200 repeatedly performs the present routine during operation of the internal combustion engine 100 by a predetermined processing period Δt (for example, 10 ms). Note that in FIG. 15, the contents of the processing of the steps other than the processing of step S701 are already explained, so here explanations will be omitted.

At step S701, the electronic control unit 200 corrects the judgment timeout lime based on the slate of deposition of PM. The judgment timeout time is corrected to become longer the greater the amount of PM deposited at the periphery of the filter.

According to the above-explained present embodiment, it is possible to suitably correct the judgment timeout lime according to the state of deposition of PM, so it is possible to more reliably keep mistaken judgment of the temperature being liable to excessively rise from ending up occurring.

Sixth Embodiment

Next, a sixth embodiment of the present disclosure will be explained. The above-mentioned embodiments basically judged an excessive rise in temperature according to a trend in change of temperature of the filler backflow gas temperature $T_{GAS}$ and, when the exhaust temperature sensor 54 was malfunctioning, as an exception compared the fuel cut time with the allowable fuel cut time to judge whether an excessive rise in temperature has occurred. As opposed to this, in the present embodiment, these two methods for judging whether an excessive rise in temperature has occurred are not particularly viewed as being better or worse. It differs from the above embodiments on the point dial that is suitably selectively uses the two methods for judging an excessive rise in temperature in accordance with need. Below, this point of difference will be focused on in the explanation.

Figure 16:
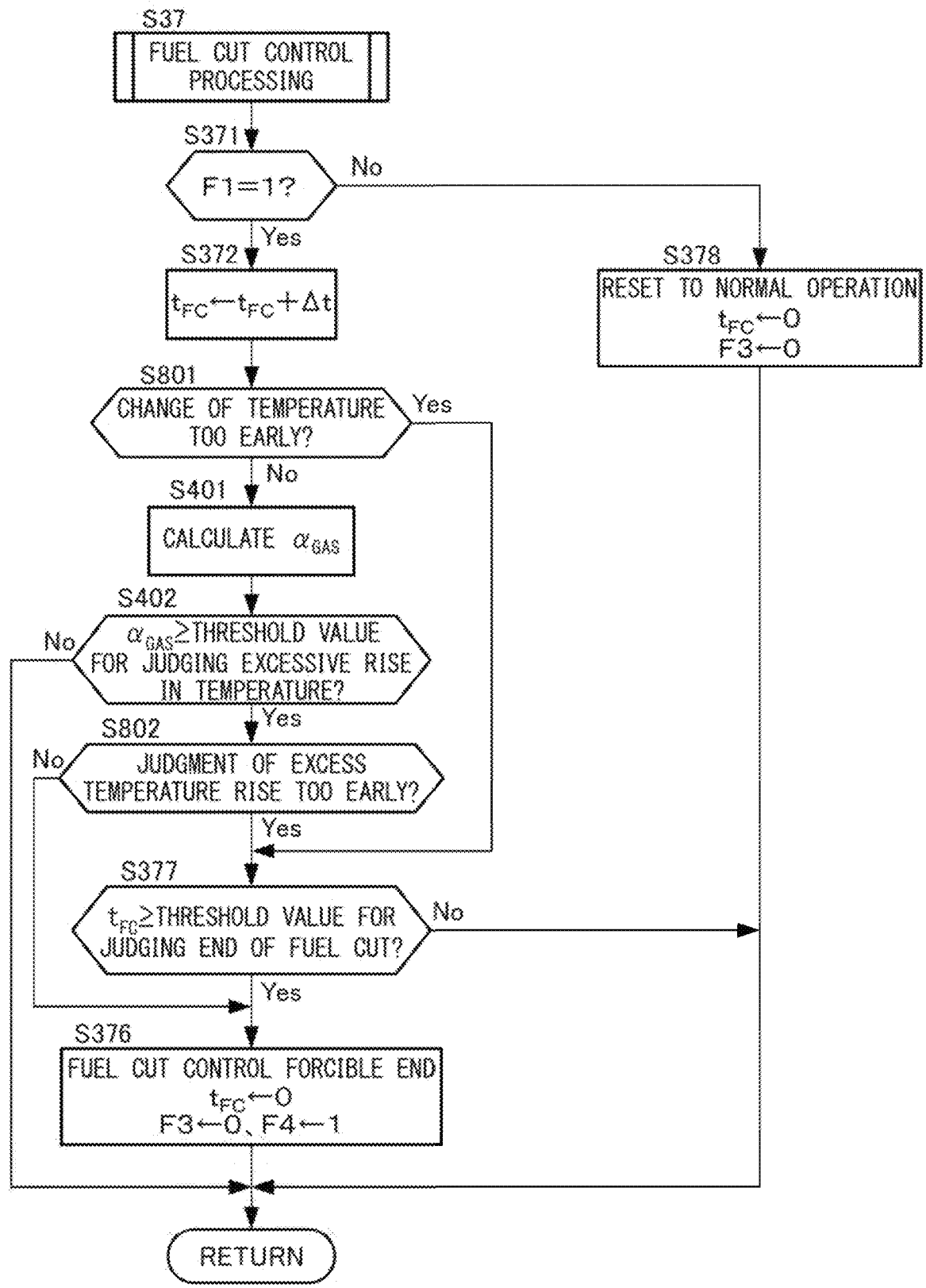
FIG. 16 is a flow chart explaining details of fuel cut control processing according to a sixth embodiment of the present disclosure.

FIG. 16 is a flow chart explaining details of fuel cut control processing according to the present embodiment. Note that, in FIG. 16, the contents of the processing of the steps other than the processing of step S801 and step S802 are already explained, so here explanations will be omitted.

At step S801, the electronic control unit 200 judges if the degree of decrease (speed of decrease) of the filter backflow gas temperature $T_{GAS}$ has become abnormally large. In the present embodiment, if the difference between the filter backflow gas temperature $T_{GAS}$ at the time of start of fuel cut control and tire current filter backflow gas temperature $T_{GAS}$ is equal to or greater than a predetermined value, the electronic control unit 200 judges that the degree of decrease (speed of decrease) of the filter backflow gas temperature $T_{GAS}$ has become abnormally large. In this case, it can be judged that the reliability of tire exhaust temperature sensor 54 is low, so the electronic control unit 200 proceeds to the processing of step S377 where it compares the fuel cut time with the allowable fuel cut time for judgment of excessive temperature rise. On the other hand, if the degree of decrease of the filter backflow gas temperature $T_{GAS}$ (speed of decreases) is normal, the electronic control unit 200 proceeds to the processing of step S401.

At step S802, the electronic control unit 200 judges whether the time from when fuel cut control is started to judgment of excessive temperature rise is too short.

A certain extent of time is required from when fuel cut control is started to judgment of excessive temperature rise, that is, until a large amount of PM starts to burn all at once, but, for example, sometimes the PM deposited on the exhaust temperature sensor 54 itself burns etc. and the filter backflow gas temperature $T_{GAS}$ temporarily rises. This causes mistaken judgment. Therefore, in the present embodiment, even if it is judged at step S402 that the rate of change by time $\alpha_{GAS}$ is equal to or greater than the threshold value for judgment of excessive rise of temperature, if the time from when fuel cut control is started to judgment of excessive temperature rise is too short, the electronic control unit 200 proceeds to the processing of S377 and compares the fuel cut time with the allow able fuel cut time for judgment of excessive temperature rise.

Note that, in the present embodiment, if the difference between the threshold value for judgment of end of fuel cut and the time from when fuel cut control is started to when it is judged at step S402 that the rate of change by time $\alpha_{GAS}$ as is equal to or greater than the threshold value for judgment of excessive rise of temperature is equal to or greater than a predetermined value, the electronic control unit 200 judges that the time from when the fuel cut control is started to judgment of excessive temperature rise is too short and proceeds to the processing of step S377.

The above-explained electronic control unit 200 according to the present embodiment is provided with the above-mentioned fuel cut control part, forced ending part, and allowable fuel cut time calculating part. Further, the forced ending part according to the present embodiment is configured so that when the difference between the allowable fuel cut time and the time from when fuel cut control is started to a predetermined liming at which it can be judged that the trend in change of temperature of the filter backflow gas temperature $T_{GAS}$ switches from a decreasing trend to an increasing trend is equal to or greater titan a predetermined value, it forcibly makes the fuel cut control end if the time of performance of fuel cut control is equal to or greater than the allowable fuel cut time.

Due to this, for example, in the case where the PM deposited on the exhaust temperature sensor 54 itself burns etc. and temporarily the filter backflow gas temperature $T_{GAS}$ rises, it is possible to keep it ending up being mistakenly judged that the temperature is liable to excessively rise.

Above, embodiments of the present disclosure were explained, but the above embodiments only show some of the examples of application of the present disclosure and are not intended to limit the technical scope of the present disclosure to the specific constitutions of the above embodiments.

The invention claimed is:

1. A control device for an internal combustion engine, wherein
the internal combustion engine comprises:
an engine body;
a filter provided in an exhaust passage of the engine body and trapping particulate matter in the exhaust; and
a temperature sensor provided at the exhaust passage at the downstream side from the filter in a direction of flow of exhaust and detecting a temperature of gas flowing out from the filter, and wherein
the control device is configured to:
perform fuel cut control, stopping a supply of fuel to a combustion chamber of the engine body; and
forcibly end the fuel cut control even if a condition for performance of fuel cut control stands based on a trend in change of temperature of the gas temperature detected by the temperature sensor when reaching a predetermined timing at which the control device determines that the trend in change of temperature of the gas temperature will switch or has switched from a decreasing trend to an increasing trend.

2. The control device for the internal combustion engine according to claim 1, wherein
the predetermined timing is a timing at which an amount of change of temperature of the gas temperature becomes equal to or greater than a predetermined amount.

3. The control device for the internal combustion engine according to claim 2, wherein
the predetermined amount is 10° C.

4. The control device for the internal combustion engine according to claim 1, wherein
the predetermined timing is a timing at which a rate of change of temperature of the gas temperature becomes equal to or greater than a predetermined rate.

5. The control device for the internal combustion engine according to claim 4, wherein
the predetermined rate is any value from −1 to 1.

6. The control device for the internal combustion engine according to claim 1, wherein the control device is further configured to:
calculate, based on a temperature of the filter and amount of deposition of particulate matter, an allowable fuel cut time comprised of a time of performance of fuel cut control at which the temperature of the filter is not liable to become equal to or greater than a predetermined temperature at which the filter is liable to be made to deteriorate if performing fuel cut control; and
prohibit in advance performance of fuel cut control when the allowable fuel cut time is less than a predetermined time.

7. The control device for the internal combustion engine according to claim 1, wherein the control device is further configured to:
calculate, based on a temperature of the filter and amount of deposition of particulate matter, an allowable fuel cut time comprised of a time of performance of fuel cut control at which the temperature of the filter is not liable to become equal to or greater than a predetermined temperature at which the filter is liable to be made to deteriorate if performing fuel cut control;
calculate, based on the temperature of the filter and the amount of deposition of particulate matter, a judgment timeout time until a steady state where the gas temperature detected by the temperature sensor no longer changes, and
forcibly end fuel cut control, if when the time of performance of the fuel cut control becomes equal to or greater than the allowable fuel cut time, when the time of performance of the fuel cut control becomes equal to or greater than the judgment timeout time.

8. The control device for the internal combustion engine according to claim 1, wherein the control device is further configured to:
calculate, based on a temperature of the filter and amount of deposition of particulate matter, an allowable fuel cut time comprised of a time of performance of fuel cut control at which the temperature of the filter is not liable to become equal to or greater than a predetermined temperature at which the filter is liable to be made to deteriorate if performing fuel cut control, and
forcibly end the fuel cut control, when the time of performance of the fuel cut control becomes equal to or greater than the allowable fuel cut time, when a difference of the allowable fuel cut time and the time from when the fuel cut control was started to when the timing became the predetermined timing is equal to or greater than a predetermined value.

* * * * *